United States Patent
Van Brandenburg et al.

(10) Patent No.: US 9,723,047 B2
(45) Date of Patent: Aug. 1, 2017

(54) NETWORK-INITIATED CONTENT STREAMING CONTROL

(71) Applicants: Koninklijke KPN N.V., The Hague (NL); Nederlandse Organisatie voor Toegepast-Natuurwetenschappelijk Onderzoek TNO, Delft (NL)

(72) Inventors: Ray Van Brandenburg, The Hague (NL); Omar Aziz Niamut, Vlaardingen (NL); Mattijs Oskar Van Deventer, Leidschendam (NL)

(73) Assignees: Koninklijke KPN N.V., The Hague (NL); NEDERLANDSE ORGANISATIE VOOR TOEGEPAST-NATUURWETEN-SCHAPPELIJK ONDERZOEK TNO, 's-Gravenhage (NL)

( * ) Notice: Subject to any disclaimer, the term of this patent is extended or adjusted under 35 U.S.C. 154(b) by 396 days.

(21) Appl. No.: 14/368,763

(22) PCT Filed: Dec. 27, 2012

(86) PCT No.: PCT/EP2012/076938
§ 371 (c)(1),
(2) Date: Jun. 25, 2014

(87) PCT Pub. No.: WO2013/098317
PCT Pub. Date: Jul. 4, 2013

(65) Prior Publication Data
US 2014/0379871 A1    Dec. 25, 2014

(30) Foreign Application Priority Data

Dec. 29, 2011 (EP) .................................. 11196049
Feb. 20, 2012 (EP) .................................. 12156141

(51) Int. Cl.
*G06F 15/16* (2006.01)
*H04L 29/06* (2006.01)
*H04L 29/08* (2006.01)

(52) U.S. Cl.
CPC ........ *H04L 65/608* (2013.01); *H04L 65/1069* (2013.01); *H04L 65/4084* (2013.01);
(Continued)

(58) Field of Classification Search
CPC .............. H04L 65/608; H04L 65/1069; H04L 65/4084; H04L 65/4092; H04L 67/025; H04L 67/42
See application file for complete search history.

(56) References Cited

U.S. PATENT DOCUMENTS 8,453,190 B2 * 5/2013 Liwerant ............ H04N 7/17318
725/105
8,966,522 B2 * 2/2015 Liwerant ............ H04N 21/2181
725/114
(Continued)

FOREIGN PATENT DOCUMENTS

EP    1 768 350         3/2007
EP    1 919 125 A1      5/2008
(Continued)

OTHER PUBLICATIONS

Lohmar, T., et al., "Dynamic Adaptive HTTP Streaming of Live Content," World of Wireless, Mobile and Multimedia Networks (WoWMoM), 2011 IEEE International Symposium, pp. 1-8 (2011).
(Continued)

*Primary Examiner* — Moustafa M Meky
(74) *Attorney, Agent, or Firm* — Hamilton, Brook, Smith & Reynolds, P.C.

(57) ABSTRACT

Methods and systems are described for enabling network-initiated control of streaming of segmented content from a
(Continued)

content delivery node to at least one client, said client being configured to access at least part of said segmented content on the basis of a manifest file, wherein a method may comprise: receiving a first manifest file identifying one or more segments and location information for locating one or more content delivery nodes configured to transmit said one or more segments to said at least one client; in response to said reception of said first manifest file, providing channel set-up information; and, establishing at least one streaming control channel between said at least one client and a control channel server function associated with said content delivery node on the basis of said control channel set-up information, said at least one client being configured for receiving at least one manifest file update message via said streaming control channel.

15 Claims, 16 Drawing Sheets

(52) U.S. Cl.
CPC ........ *H04L 65/4092* (2013.01); *H04L 67/025* (2013.01); *H04L 67/42* (2013.01)

(56) References Cited

U.S. PATENT DOCUMENTS

| | | | |
|---|---|---|---|
| 9,271,021 B2* | 2/2016 | Adimatyam | H04L 65/4084 |
| 2005/0246752 A1* | 11/2005 | Liwerant | G06Q 30/02 |
| | | | 725/109 |
| 2006/0212595 A1* | 9/2006 | Chen | H04L 65/607 |
| | | | 709/232 |
| 2008/0147786 A1* | 6/2008 | Liwerant | H04N 7/17318 |
| | | | 709/203 |
| 2008/0155629 A1* | 6/2008 | Liwerant | G06Q 30/02 |
| | | | 725/110 |
| 2008/0256583 A1* | 10/2008 | Liwerant | G06Q 30/02 |
| | | | 725/112 |
| 2009/0070471 A1 | 3/2009 | Quere et al. | |
| 2011/0161820 A1* | 6/2011 | Lee | G06F 17/30038 |
| | | | 715/723 |
| 2011/0173345 A1 | 7/2011 | Knox et al. | |
| 2011/0191684 A1* | 8/2011 | Greenberg | G06F 3/01 |
| | | | 715/719 |
| 2011/0264727 A1 | 10/2011 | Keum et al. | |
| 2012/0254365 A1* | 10/2012 | Adimatyam | H04L 65/4084 |
| | | | 709/219 |
| 2013/0283312 A1* | 10/2013 | Liwerant | H04N 21/2181 |
| | | | 725/32 |
| 2014/0140253 A1* | 5/2014 | Lohmar | H04L 65/4084 |
| | | | 370/311 |

FOREIGN PATENT DOCUMENTS

| | | |
|---|---|---|
| JP | 2013 505 612 A | 2/2013 |
| JP | 2013 520 865 A | 6/2013 |
| JP | 2015 508 596 A | 3/2015 |
| WO | WO 2011/038034 | 3/2011 |
| WO | WO 2011/059810 A2 | 5/2011 |
| WO | WO 2011/090715 A2 | 7/2011 |

OTHER PUBLICATIONS

Notification of Transmittal of the International Search Report and the Written Opinion of the International Searching Authority, or the Declaration for PCT/EP2012/076938, entitled: Network-Initiated Content Streaming Control, date of mailing, Feb. 14, 2013.
Extended European Search Report dated Oct. 11, 2012, for European Application No. 12156141.9.
Fette, I., "The WebSocket Protocol, Draft-ietf-hybi-thewebsocketprotocol-10," HyBi Working Group, Internet Draft, pp. 1-69 (2012).
Alvestrand, H., "A Datagram Transport for the RTC-Web profile," draft-alvestrand-dispatch-rtcweb-datagram-01, Networking Group, Internet-Draft, pp. 1-9 (2011).

* cited by examiner

```
File name = manifest.mf
Type of segmentation = temporal, bitrate
Channel target = ws://example.com/video
Channel parameters = {parameters}
Bitrate (low)
    server.example.com/video/segment_low-1.avi
    server.example.com/video/segment_low-2.avi
    server.example.com/video/segment_low-3.avi
    server.example.com/video/segment_low-4.avi
    server.example.com/video/segment_low-5.avi
    server.example.com/video/segment_low-6.avi
Bitrate (high)
    server.example.com/video/segment_high-1.avi
    server.example.com/video/segment_high-2.avi
    server.example.com/video/segment_high-3.avi
    server.example.com/video/segment_high-4.avi
    server.example.com/video/segment_high-5.avi
    server.example.com/video/segment_high-6.avi
```

NETWORK-INITIATED CONTENT STREAMING CONTROL

This application is the U.S. National Stage of International Application No. PCT/EP2012/076938, filed Dec. 27, 2012, which designates the U.S., published in English, and claims priority under 35 U.S.C. §§119 or 365(c) to European Application No. 12156141.9, filed Feb. 20, 2012, and European Application No. 11196049.8, filed Dec. 29, 2011.

FIELD OF THE INVENTION

The invention relates to controlling streaming of content, and, in particular, though not exclusively, to methods for enabling network-initiated control of streaming of segmented content, a client for use in a content processing device for controlling reception of segmented content, a control channel server function and a data structure for enabling network-initiated control of streaming of segmented content and a computer program product using such method.

BACKGROUND OF THE INVENTION

Currently an increasing number of video streaming techniques make use of so-called content segmentation wherein content data, e.g. video data, are logically or virtually split into several segment files or streams, thus generating segmented content. A segment file may relate to a file comprising content data, which may be retrieved by a file retrieval protocol, e.g. HTTP or FTP. Similarly, a segment stream may relate to a stream comprising content data which may be retrieved by a streaming protocol, e.g. RTSP/RTP or HAS. Segment files or streams (hereafter in short also referred to as segments) can be delivered to a client separately, but when recombined at the client they provide a seamless video stream.

During the content segmentation process a so-called manifest file is generated that identifies segments and describes the relation between the different segments and the location(s) where the segments may be retrieved. Segmented content can be provided in several representations, e.g. alternative versions of the same content that differ for example in resolution, the number of audio channels and/or a different bitrate. All representations are temporally aligned such that segments of different representations can be interchanged seamlessly. Streaming of segmented content in different representations is referred to as adaptive streaming wherein an adaptive streaming protocol such as HTTP adaptive streaming (HAS) and related protocols may be used.

HAS enables the delivery of (live) video by means of the HTTP protocol, by transmitting the video in segments that are independently requested by the client from a web server. Various commercial and standardized HAS protocols exist, such as Apple HTTP Live Streaming http://tools.ietf.org/html/draft-pantos-http-live-streaming-07, Microsoft Smooth Streaming http://www.iis.net/download/ SmoothStreaming, Adobe HTTP Dynamic Streaming http://www.adobe.com/products/ httpdynamicstreaming, 3GPP-DASH TS 26.247 Transparent end-to-end Packet-switched Streaming Service (PSS); Progressive Download and Dynamic Adaptive Streaming over HTTP] and MPEG Dynamic Adaptive Streaming over HTTP MPEG DASH ISO/IEC 23001-6).

Segmented content may be used to dynamically adapt to changing bandwidth requirements, e.g. by switching from a high to a low quality video stream. Moreover, segmented content may also allow for discriminating between popular and less popular (video) segments. For example, typically content associated with the beginning of a video (such as trailers) will be watched more often (and thus more popular) than content at the end. Similarly for some use cases, low-bitrate lower-quality video content (e.g. the lowest resolution HAS segments) will likely be downloaded more frequently than high quality content (e.g. higher-resolution HAS segments), which may be more expense or demands more from the receiving device or requires more bandwidth. The above-mentioned properties of segmented content may be advantageously used by a content delivery network (CDN), which is configured to deliver content to a consumer. A CDN may for example store popular, more frequently requested content segments at multiple delivery nodes in the CDN so that bandwidth problems may be reduced and efficient delivery is guaranteed. A CDN control function (CDNCF) may centrally manage the locations within the CDN, hereafter referred to as delivery nodes, where content segments associated with a content item (such as a video or movie) may be retrieved (get).

Although a lot of different streaming protocols, such as RTP/RTSP or RTMP, may be used for implementing streaming of (segmented) content to a client, HTTP or HTTP-based streaming protocols are the most widely used within a CDN. These streaming protocols use standard HTTP—a stateless, client-server protocol—to request and receive content segments from a server not requiring new functionality and allowing for segments to be cached transparently. Moreover, unlike most other streaming solutions, HTTP traffic as such is usually not automatically blocked by firewalls or network address translators (NATs).

Moreover, HTTP-based streaming is not session-based. This means that the HTTP server does not need to maintain sessions for the various clients it is serving. This way the HTTP server architecture can be kept simple. However, this session-less nature combined with the fact that HTTP is a client-initiated protocol also means that an HTTP server, e.g. a delivery node in a CDN, is not able to initiate communication with a client.

In order to enable a client to access (download/retrieve) segments stored in a CDN, the client is provided with a so-called manifest file comprising a list of segments each being identified by a segment identifier (e.g. a segment file name) and segment locations (segment locators), e.g. URLs, pointing to a network node where the segments may be accessed (retrieved). Depending on the particular CDN and/or implementation, a pre-defined manifest file may be stored on one or more (delivery) nodes of the CDN, together with the associated segments, or a manifest file may be dynamically generated by the CDN upon user request.

This way, when a consumer (client device) requests a particular segmented content item (such as a video), the CDN may, on request, identify a manifest file stored on a (delivery) node that is suitable for enabling the delivery of the requested content item to the customer (device). Alternatively, the CDN may generate a new manifest file identifying one or more delivery nodes which, taken together, are suitable for delivering the requested content segments to the customer. Subsequently the CDN may send the generated manifest file in a response to the requesting client (device) of the consumer.

During streaming of the content segments, the network configuration or load distribution in the CDN may change. For example, a failure or overload in a node of a CDN may result in a situation wherein one or more delivery nodes in a CDN are no longer able to deliver content segments identified in the manifest file. Also in other situations, e.g. in an impending overload situation, it may be required to prevent an overload situation by transferring the task of delivering a particular content segment to a particular consumer (content receiving device) during the streaming process from one delivery node to another delivery node of the CDN or even to a delivery node in another CDN. One can even imagine that when a client device of a particular consumer changes its position, it may also be more advantageous to have another delivery node, now being the more closer one, take-over the streaming from the original node. Other events in the delivery network that may require or warrant a change in the delivery of segments to a client (i.e. trigger load balancing mechanisms in the network) are planned outages, a Server Migration, a CDN Migration and so on.

In known methods such change in the delivery of segments to a client may be realized in several ways. In some cases a CDN may use for example an HTTP redirect scheme in order to redirect the request for a segment to the desired delivery node. Such scheme however may require and trigger a separate redirect response message (simply referred to as a redirect) for every segment the client will request in the future, or even multiple redirect response messages per requested segment, thereby introducing a substantial increase of the signalling load in the network. This is especially relevant in the case when a large amount of consumers is dependent on the same delivery node and is simultaneously requesting and retrieving the same content. Not only may the additional signalling load flood parts or all of the CDN, the redirects may cause unacceptable service interruptions at the client-side, since the delivery of the individual content segments is suddenly delayed as a result of the redirects. Hence the redirect scheme may not be able to effectively prevent service interruptions due to changes in the network configuration (as a result of for instance a delivery node failure). The service interruptions may be more pronounced, in situations were for example little content is buffered at the client device, in situations were multiple redirects occur, or were the new target delivery node is located at a considerable larger distance to the client device, compared to the previous one.

Alternatively, the CDN may generate a newly updated manifest file for the client on the basis of the new network configuration. However due to its very nature, the HTTP protocol does not allow the server-side (e.g. the CDN) to directly and or pro-actively initiate the transmission of such newly updated manifest file to the client or, alternatively, initiate a client request for such a newly updated manifest file. Whether the client receives an updated manifest file or not is completely dependent on the initiative of the client (which however is not aware of (pending) changes in the network configuration) to request such update. Likewise, if for example a segmented content stream would be made available by the CDN in a higher representation than present in the manifest file previously provided to the client, the client has no way of knowing this and cannot profit from such higher quality stream. Even if the client would be configured to e.g. periodically request manifest file updates, such update schemes cannot effectively (quickly) an on ad-hoc basis react to changes in the network configuration and avoid service interruptions due to such changes. It would be merely coincidental if such update frequency would precisely coincide with a suddenly needed configuration change. Furthermore, implementing a very high update frequency, (which makes use of a HTTP based request-response signalling mechanism), has the disadvantage of causing a considerable overhead signalling load in the network and processor load on the client and network side, even during periods that no configuration changes (e.g. changes in the delivery of segmented content to a client) are needed or recommendable.

Hence, there is a need in the art for methods and systems, which enable improved control of streaming content to a client.

SUMMARY OF THE INVENTION

It is an objective of the invention to reduce or eliminate at least one of the drawbacks known in the prior art. In a first aspect the invention may relate to a method for enabling network-initiated control of streaming of segmented content from a delivery node to at least one client, preferably a HTTP Adaptive Streaming (HAS) client, such as a MPEG DASH compatible adaptive streaming client. The method may comprise at least one of the steps of: receiving a first manifest file, preferably said manifest file comprising one or more segment identifiers for identifying one or more segments and location information for locating one or more content delivery nodes configured to transmit one or more segments associated with said segment identifiers to said at least one client; providing the client with channel set-up information; and/or, establishing at least one streaming control channel between said at least one client and the network, preferably a control channel server function associated with at least one of said one or more delivery nodes, on the basis of said provided channel set-up information. In an embodiment, the steps may be executed by the client. In another embodiment, said at least one client may be configured for receiving at least one manifest file update message via said streaming control channel. Alternatively the control channel may be used by the network (e.g. the control channel server function) to communicate messages of server or network side events associated with the streaming of segment content, other than the update messages that indicate the availability of a manifest file update. Such events may relate to information (e.g. parameters) that cannot be communicated through a manifest file update, or for which it may be more appropriate (for example faster) to communicate these to the client separate from the manifest file update. In such embodiments the client may alternatively be configured for receiving and/or processing these other event messages. In another embodiment, said at least one client may be configured to access at least part of said segmented content on the basis of a manifest file. In a further embodiment the reception of a manifest file by the client may trigger the client to set-up a streaming control channel with the network, preferably on the basis of the provided channel set-up information, wherein the streaming control channel enables the network, e.g. a CDN, to pro-actively provide the client with manifest file update messages, indicating the availability of manifest file updates. The manifest file update messages may be transmitted pro-actively over the control channel to the client without the need for a client first transmitting a (HTTP) request to the network. This way, the streaming process executed on the client may swiftly react to changes in the network configuration and/or network problems, e.g. an eminent overload situation or a network failure, whereby the network is now enabled to pre-emptively signal the client By implementing a control channel, the limitations and disadvantages of known (HTTP) request-response mechanisms on which prior art type segmented streaming solutions are based, some of which being thoroughly fully discussed in the background section, may be alleviated and/or overcome.

In an embodiment the method may comprise monitoring said streaming control channel for at least one manifest file update message. In this embodiment, the client may continuously monitor the channel for update messages from the network so that swift response by the client to such update message is guaranteed. This monitoring process may for example be executed as a background process during a streaming process.

In an embodiment the method may comprise at least one of the steps of: detecting a manifest file update message; and, optionally, retrieving at least part of a second manifest file in response to said manifest file update message. In another embodiment, the method may further comprise: requesting a segment stream or file on the basis of said second manifest file. Hence, a manifest file update message received by the client from the network may signal the client that an updated manifest file is required and/or available and that the streaming process should or may be continued on the basis of this updated manifest file. Here an update in the manifest file may be required due to a change in the network configuration and/or network problem such as a network failure or a network overload. This way, the network may efficiently and pro-actively initiate control of the streaming process in response to a certain event in the network. In prior-art HTTP based segmented streaming solutions, which by definition are based on HTTP request and response mechanisms that require a first initiative from the client, such pro-active network initiated control of the streaming process is simply not possible.

In an embodiment said at least part of said channel set-up information may be provided to said client in said first manifest file, alternatively it may be provided in a separate message to the client. In further embodiments said providing of said channel set-up information, comprises pre-configuring the client with said channel set-up information. In one embodiment, said channel set-up information may comprise server location information, preferably at least one URL, for locating a control channel server function in the network. Hence, the manifest file may comprise at least part of the information required to set-up the control channel.

In an embodiment said at least part of said manifest file update message may comprise at least part of a second manifest file. In this embodiment, the streaming control channel may be used to transmit part of the update in the manifest file. In another embodiment said manifest file update message may comprise manifest file location information, preferably at least one URL, for locating and requesting at least part of said second manifest file. This way, the network may inform the client in a simple and efficient way where the updated manifest file (or a part thereof) may be retrieved.

In one embodiment, said streaming control channel may be established on the basis of a WebSocket protocol. In an embodiment, a content delivery network (CDN) entity, preferably the control channel server function, and a client may comprise a HTTP WebSocket API configured to use the WebSocket protocol and the channel set-up information to set up a streaming control channel between the client and said CDN entity. The WebSocket connections typically use standard HTTP ports 80 and 443 so that data may easily traverse firewalls and NATs, but also other ports may be used. Furthermore, the protocol provides a scalable solution as it has a low message overhead. Moreover, WebSocket is based on HTTP so that problems associated with traversal of firewalls may be eliminated or at least substantially reduced. Moreover, it provides the possibility for tunnelling of other protocols.

In an embodiment said at least part of said segmented content is delivered to said at least one client on the basis of a streaming protocol, preferably an HTTP-based streaming protocol or derivatives thereof. In another embodiment the streaming control channel may be established using the SIP protocol, an XMPP protocol and/or combinations thereof.

In another aspect, the invention may relate to a method for enabling network-initiated control of streaming of segmented content from a delivery node to at least one client wherein said method may comprise at least one of the steps of: delivering a manifest file comprising one or more segment identifiers for identifying one or more segments and location information for locating one or more content delivery nodes configured to transmit one or more segments associated with said segment identifiers to at least one client; receiving a request for setting up a streaming control channel between a control channel server function associated with said one or more content delivery nodes and said at least one client; and/or, establishing said at least one streaming control channel. In one embodiment said control channel server function may be configured to transmit at least one manifest file update message to said client. In another embodiment, said client may be configured to access at least part of said segmented content on the basis of a manifest file. In another embodiment, the manifest file may comprise one or more segment identifiers and/or location information for locating one or more content delivery nodes configured to transmit one or more segments associated with said one or more segment identifiers to said at least one client.

In an embodiment said at least part of said at least a first part of said one or more delivery nodes may be configured as first delivery nodes belonging to a first content delivery network (CDN1) configured to deliver at least a first part of said segments to said client; and/or, at least a second part of said delivery nodes may be configured as second delivery nodes belonging to a second content delivery network (CDN2) configured to deliver at least a second part of said segments to said client. Hence, in this embodiment, at least a part of the segments are delivered to the client by a second, further CDN.

In an embodiment said method may comprise: monitoring one or more network parameters, preferably at least one of said one or more network parameters associated with an overload, an impending overload, a failure or a network configuration change associated with said one or more delivery nodes; generating a manifest file update message if one or more predetermined conditions associated with said network parameters are met; and, optionally, transmitting said manifest file update message to said at least one client.

In an embodiment said method may comprise: determining an overload, an impending overload, a failure or a change in the network configuration associated with one or more of said first and/or second delivery nodes; identifying one or more clients retrieving or expecting to retrieve segments from said one or more first and/or second delivery nodes associated with the determined overload, impending overload, failure or network configuration change; determining one or more streaming control channels associated with at least part of said identified clients; and, optionally, transmitting a manifest file update message to at least part of said identified clients over said one or more streaming control channels.

In an embodiment said at least part of said overload, failure or network configuration change may be associated with at least one of said second delivery nodes belonging to a second CDN2. In another embodiment said method may comprise: said second CDN2 transmitting an overload notification, a failure notification or a network configuration change notification to said first CDN1, said overload or failure notification comprising one or more second delivery node identifiers associated with said overload or failure.

In an embodiment said method may comprise: storing client delivery information in a first CDN database, said client delivery information comprising at least one of: a streaming control channel identifier; a client identifier, preferably an IP address associated with said client; a delivery node identifier associated with a delivery node hosting one or more segments referred to in said manifest file; a content delivery network identifier; and/or, a manifest file identifier.

In yet another aspect, the invention may relate to a method for enabling network-initiated control of streaming of segmented content associated with at least first and second content delivery networks (CDN1,CDN2) to one or more clients, said first CDN1 being associated with a first control channel server function and said second CDN2 being associated with a second control channel server function, wherein said method may comprise at least one the steps of: generating a first manifest file associated with segmented content, said first manifest file comprising one or more segments and location information for locating one or more content delivery nodes associated with said first CDN1; and/or, requesting said second control channel server function a second manifest file associated with said segmented content wherein said second manifest file may comprise one or more segments and/or location information for locating one or more content delivery nodes associated with said second CDN2; generating a further manifest file on the basis of said first and second manifest file and, optionally, channel set-up information; establishing at least a first streaming control channel between said at least one client and said first control channel server function on the basis of said channel set-up information, wherein said first control channel server function may be configured to generate a manifest file update message and to transmit said message via said streaming control channel to said client.

In a further aspect, the invention may relate to a client for use in a content processing device, wherein said client may be configured for: transmitting a request for delivering segmented content to said server; receiving a manifest file comprising one or more segment identifiers and location information for locating one or more content delivery nodes configured to transmit one or more segments associated with said one or more segment identifiers to said at least one client; being provided with first channel set-up information; and/or, establishing a first streaming control channel between said at least one client and said a control channel server function associated with said first CDN1 on the basis of said provided first channel set-up information. In one embodiment said at least one client being configured for receiving at least one manifest file update message from said first control channel server function.

In an aspect, the invention may relate to a control channel server function associated with a delivery node for enabling network-initiated controlled transmission of segmented content from said delivery node to one or more clients, wherein said control channel server function may be configured for at least one of the steps of: receiving at least one request for delivering segmented content to said one or more clients; generating at least one manifest file comprising one or more segment identifiers and location information for locating one or more content delivery nodes configured to transmit one or more segments associated with said one or more segment identifiers to said client, and, optionally, channel set-up information; transmitting said at least one manifest file to said client; and, participating in the set-up or establishing of at least a first streaming control channel between said at least one client and said control channel server function on the basis of said channel set-up information. In one embodiment, said control channel server function may be further configured to generate a manifest file update message and to transmit said message via said first streaming control channel to said client.

In one embodiment said generating said at least one manifest file may comprise: providing one or more first segment identifiers and first location information for locating one or more content delivery nodes in a first content delivery network (CDN1); requesting a second content delivery network one or more second segment identifiers and second location information for locating one or more content delivery nodes in said second content delivery network (CDN2); generating said manifest file on the basis of at least part of said one or more first and second segment identifiers and first and second location information respectively.

In another embodiment said control channel server function may be further configured to: receive an overload notification from said second content delivery network; and, send an manifest file update message via said first streaming control channel to said client in response to said overload notification.

In an a further aspect, the invention may relate to a data structure, preferably a manifest file, for use in a client as described above wherein said data structure may comprise one or more segment identifiers and location information for locating one or more content delivery nodes configured to transmit one or more segment associated with said one or more segments to said client; said data structure further comprising at least part of said channel set-up information. In one embodiment, said channel set-up information may comprise location information, preferably one or more URLs, associated with a network node comprising a control channel server function configured for setting up a streaming control channel with said client.

The invention also relates to computer program product comprising software code portions configured for, when run in the memory of a computer, executing the method steps according to any of the method steps as described above.

The invention will be further illustrated with reference to the attached drawings, which schematically will show embodiments according to the invention. It will be understood that the invention is not in any way restricted to these specific embodiments.

BRIEF DESCRIPTION OF THE DRAWINGS

FIG. 14 depicts a manifest file according to one embodiment of the invention.

DETAILED DESCRIPTION

Figure 1:
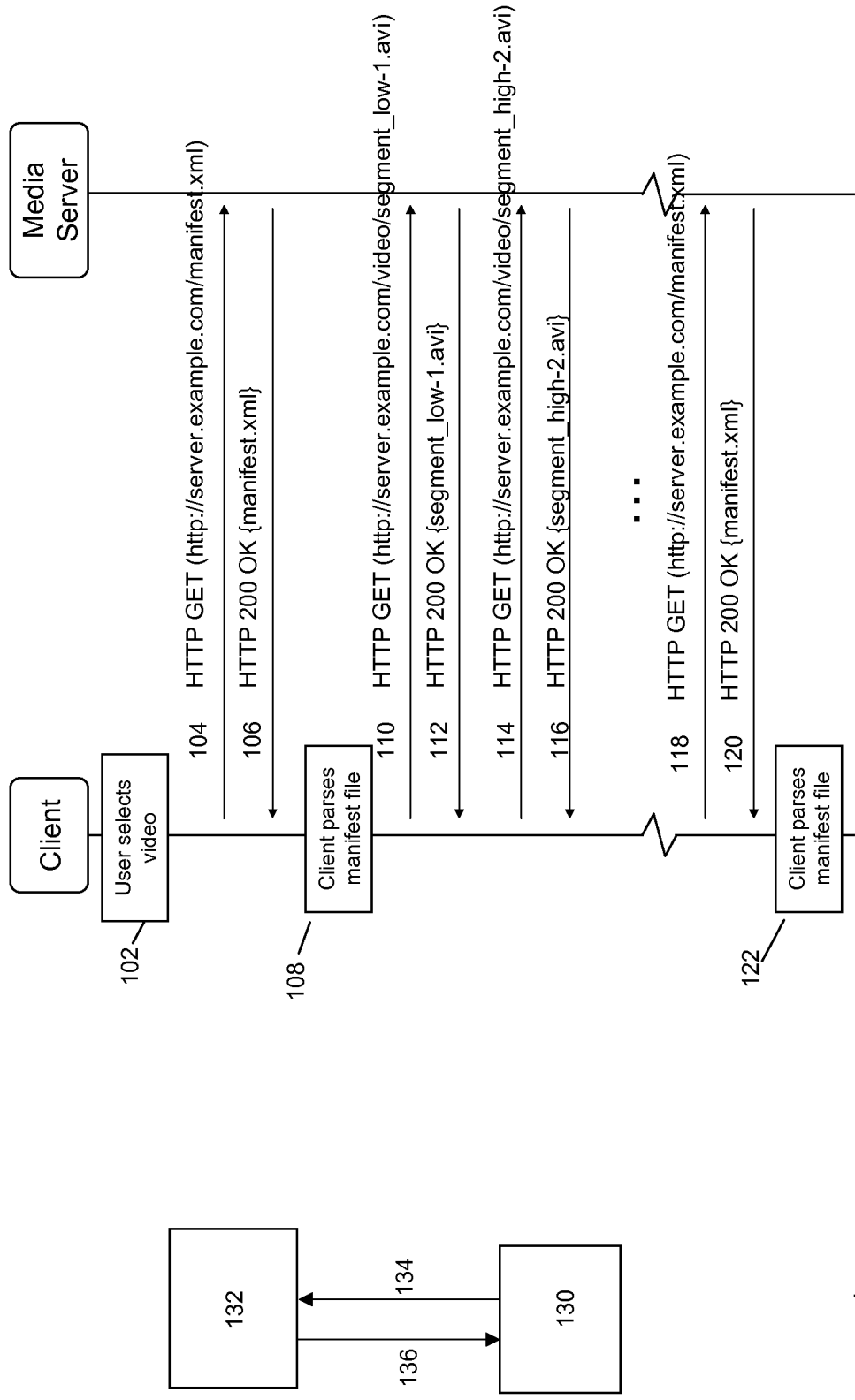
FIG. 1 depicts an overview of a conventional HAS session between a client and a server.

FIG. 1 depicts an overview of a conventional HAS protocol flow between a client 130 in a terminal and a media server 132 which are configured to communicate through a streaming protocol, such as the HAS streaming protocol, comprising response and request protocol messages 134, 136. Here, a terminal may generally relate to a content processing device, e.g. a (mobile) content play-out device such as an electronic tablet, a smart-phone, a notebook, a media player, etc. In some embodiment, a terminal may be a set-top box or content storage device configured for processing and temporarily storing content for future consumption by a content play-out device. Similarly, the media server may be part of or associated with a content provider or a content delivery network (CDN).

The protocol flow may start by a user selecting a link to a video on a website (step 102) wherein the URL may point (e.g. through redirection) to a manifest file. The manifest file may relate to a special data structure comprising segment identifiers, e.g. segment file names, building a segmented video file and associated location information, e.g. URLs, for locating one or more network nodes, which are configured to deliver the segments to a client (delivery nodes); or, alternatively, to a network node that is able to determine one or more network nodes which may be able to deliver an identified segment. In yet another embodiment, the location information may also point to locations on a network node. For example, URLs associated segments may point to different folders defined in one delivery node.

A reference to a segment, preferable comprised in a manifest file, may comprise a segment identifier and/or location information associated with the segment identifier for locating the segment.

The manifest file may further comprise information describing the temporal and/or spatial relation between the segments. Such file may be stored and identified using a specific file name extension, e.g. .mf, .xml and .m3u8. The client may then send a HTTP GET request to obtain the manifest file from the server (step 104). In response, the server may respond by sending the manifest file to the client (step 106). The client thereafter parses the manifest file to obtain the locations of the segments associated with the requested video (step 108).

The client requests the first segment of the video from the location described in the manifest file and the server responds to the request by sending the requested segment to the client (steps 110, 112). On the basis of the manifest file, several segments may be retrieved (steps 114,116). Then, after a certain amount of time, the client may determine (e.g. based on a pre-defined timer running out, or the client almost reaching the end of the manifest file in a live stream) that it is time to update the manifest file and may send a request to the same location it has acquired the initial manifest from (step 118). An updated manifest file is thereafter sent to the client (step 120), which again can be processed by the client by starting the parsing of the updated manifest file (step 122).

As already discussed earlier, such conventional HAS content streaming system does not allow server-based control of the streaming process between the client and the server. It does not allow control in ad-hoc situations, which are difficult to predict and wherein direct adaptation of the streaming configuration is required.

Figure 2:
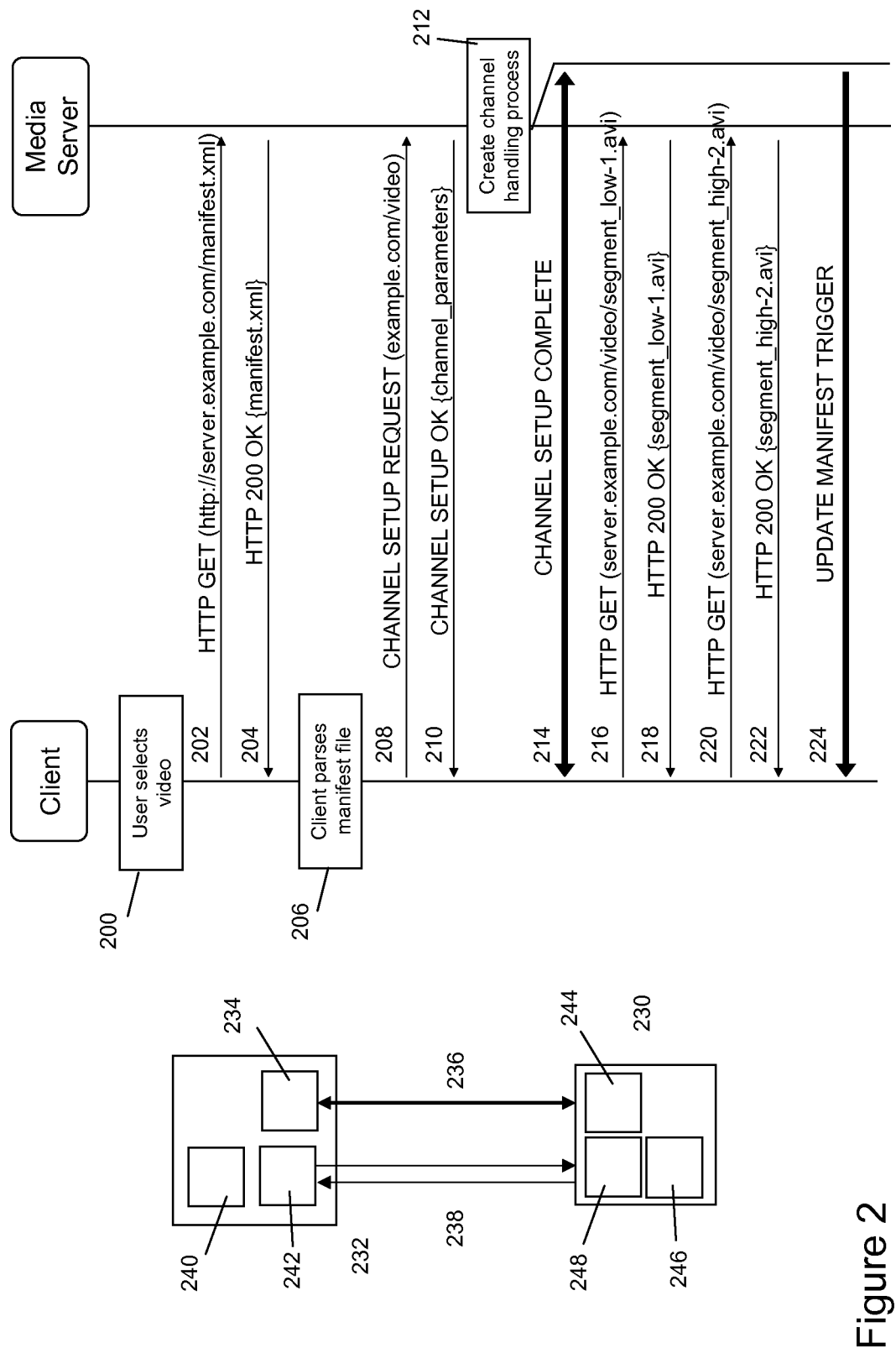
FIG. 2 depicts a protocol flow between a client and a server according to one embodiment of the invention.

FIG. 2 depicts a protocol flow between a client and a server according to one embodiment of the invention. In particular, FIG. 2 depicts a protocol flow associated with a streaming protocol such as the HTTP adaptive streaming (HAS) protocol for streaming content from a media server 232 to a client 230.

The client may comprise a streaming client function 248, which processes the stream for play-out by a video play-out function 246, and a control channel client function 244 (CCCF). Similarly, the media server may comprise a streaming server function 242 for streaming media to the streaming client function 248. The media server may further comprise a control channel server function (CCSF), e.g. a HAS control channel server function 234, in or associated with the server 232, which is configured to initiate the establishment of a streaming control channel 236 between the CCSF and the CCCF 244, wherein the streaming control channel may be used to exchange streaming control information between the client and the server, in particular streaming control information originating from the server to the client, during the streaming of segmented content 238 to the client.

Here, the process may start in the same way as in FIG. 1, i.e. a user clicking a link to a video on a website wherein the URL may points (e.g. through redirection) to a manifest file (step 200). The client may send an HTTP GET request to obtain the manifest file from the server and the server may respond thereto by sending the manifest file (in this case an XML file) to the client (step 202,204), which subsequently parses the manifest file to obtain the locations of the segments making up the requested content stream (step 206). In this particular case however, the CCSF in the server is configured to insert channel set-up information in the manifest file, which allows the CCCF in the client and the CCSF in the server to set up a streaming control channel.

On the basis of the channel-set up information embedded in the manifest file, the CCCF in the client may for example send a channel setup request to the CCSF in the server (step 208) for setting up a server-to-client streaming control channel. In one embodiment, the CCCF and the CCSF may comprise an HTTP WebSocket API configured to use the WebSocket protocol and the channel set-up information to set up a streaming control channel between the client and the server. The WebSocket connections typically use standard HTTP ports 80 and 443 so that data may easily transfer firewalls and NATs, but also other ports may be used.

The use of the WebSocket protocol has several advantages within the context of CDN and HAS, such as a low message overhead for scalability, the use of the HTTP for protocol convergence and traversal of firewalls, and possibility for tunnelling of other protocols. In another embodiment, the Session Initiation Protocol (SIP) (http://tools.ietf.org/html/rfc3261) is used, where the client may comprise a SIP User Agent and the server is a SIP Application Server.

In yet another embodiment, the Extensible Messaging and Presence Protocol (XMPP) (http://www.ietf.org/rfc/rfc3920.txt) is used, where the client may comprise an XMPP client and the server comprises an XMPP server. Both the SIP and XMPP protocol messages may be tunnelled over a WebSocket according to draft-ibc-rtcweb-sip-websocket-00 and draft-moffitt-xmpp-over-websocket-00. A more detailed description of embodiments for the different protocols is provided in FIG. 5A-5C.

During set-up of the streaming control channel, channel parameters may be exchanged between the CCCF and CCSF (step 210). Furthermore, in order to handle messages originating from the client, the CCSF may create a dedicated channel handling process (thread) (step 212). Once the streaming control channel is established 214, the client may start the process of streaming segments identified in the manifest file. The streaming process may be based on a HAS-type streaming protocol and start with a HTTP GET request comprising an URL associated with the first segment segment_low-1.avi (step 216). Once the delivery of the first segment is confirmed by a HTTP 200 OK response (step 218), the client may request a subsequent segment segment_high-2.avi (steps 220,222).

Then, the CCSF in the media server may decide that it is necessary for the client to update its manifest file. For example, the CCSF may detect a possible server overload or failure. It therefore may send a manifest update signal over the streaming control channel (step 224) optionally including an URL pointing to a new manifest file). Upon receiving the manifest file update signal, the CCCF may request the new manifest file. Upon reception of the new manifest file, the client may continue streaming on the basis of the new manifest (not shown).

In one embodiment, instead of transferring the channel set-up information in the manifest file, the channel set-up information may be pre-installed into the terminal or may be retrieved via a separate communication channel from another (network) source. In that case, when the client receives the manifest file, it triggers the streaming control channel client function to retrieve the channel set-up information in order to establish a streaming control channel as described with reference to FIG. 2 steps 208-214.

In another embodiment, the media server may be configured to stream segments to multiple clients, wherein each client is associated with its own streaming control channel in order to enable network-initiated, e.g. server-initiated, control as described with reference to FIG. 2. This way, the server may control the streaming of segmented content to multiple clients on the basis of a network parameter, e.g. the network traffic or the processing load of the server. For example, in one particular embodiment, different clients may be associated with different subscriptions, e.g. a premium subscription and a normal subscription. When a load-balancing function 240 associated with the media server detects an increase in the load, it may pre-emptively reduce its load by signalling the CCSF to initiate a manifest file update wherein (at least part of the) normal clients are provided with a new manifest file causing these clients to request segments associated with a low-rate and/or low(er) quality.

A manifest file update may be realized in various ways. In one embodiment, the whole or at least part of an updated manifest file may be sent via the streaming control channel to the client. In a further embodiment, the CCSF may send a manifest update trigger to a client, in particular the CCCF, which responds by requesting an updated or new manifest file from a (default) location, e.g. the original media server, or from a new location, e.g. a further media server, as identified in the manifest file update trigger (e.g. using an URL).

Figure 3:
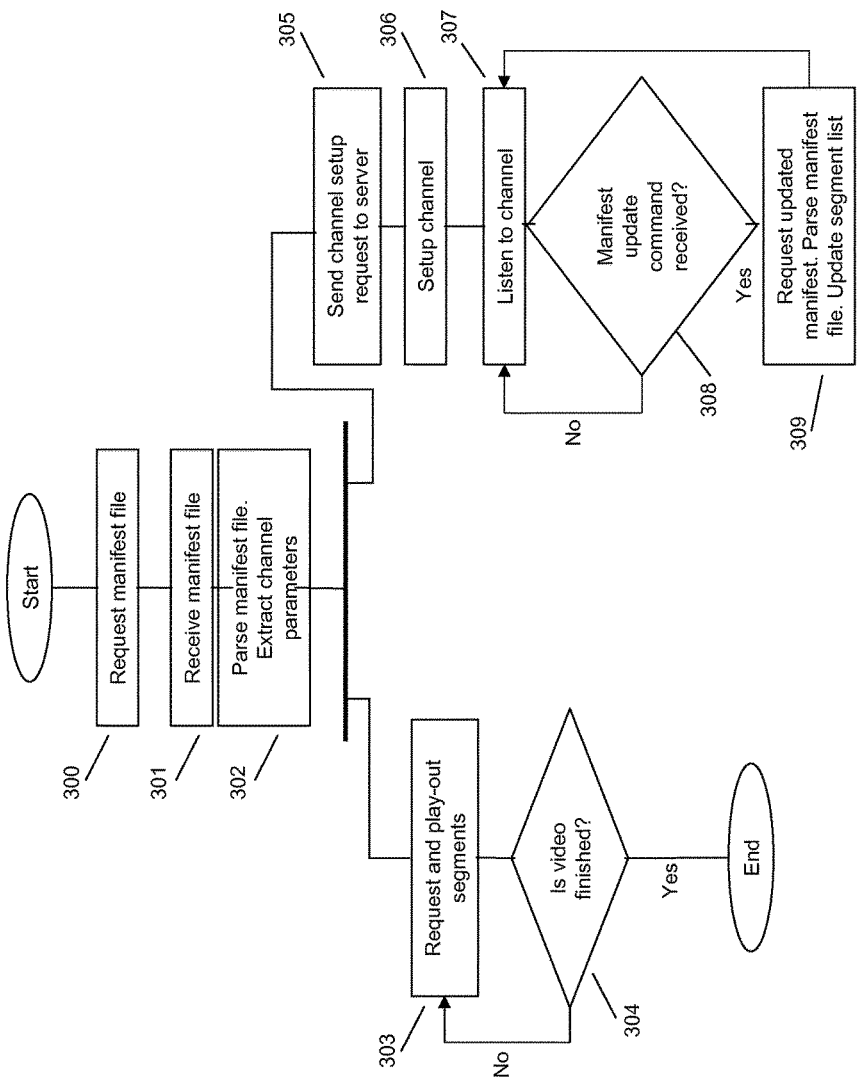
FIG. 3 depicts a client-side process flow according to an embodiment of the invention.

FIG. 3 depicts a client-side process flow according to an embodiment of the invention. In particular, FIG. 3 depicts a process flow associated with processes executed on a client for retrieval and play-out of segments and for providing server-initiated control of streaming through a streaming control channel as e.g. depicted in FIG. 2. The process may start with a client requesting a manifest file associated with a particular segmented content item (step 300). The manifest file may comprise the segment locations but also channel set-up information used by the client to set up the streaming control channel (such as a WebSocket URL and possibly some parameters for indicating e.g. the use of WebSocket sub-protocols, WebSocket version, etc. Upon receipt of the manifest file from the server, the client may parse the manifest file (step 301 and 302) and start at least two separate processes/threads in the client: at least a first process executed by the media streaming client function in the client for handling segment retrieval and playback of the segments and a second process executed by the CCCF in the client for handling the streaming control channel.

The client may use the segment locations described in the manifest file to periodically retrieve segments and play them out (step 303) until the end of the video is detected (step 304). Further, the client may use the channel set-up information embedded in the manifest file to send a channel setup request to the server on the basis of a URL described in the manifest file (step 305) and to establish a streaming control channel, between the client, in particular the CCCF in the client, and the server (step 306), in particular the CCSF associated with the server. Then, during the streaming and play out of the segments, the CCCF listens to the streaming control channel for incoming messages from the server (step 307). The streaming control channel may also be used for data transmission from the client to the server.

In case of an incoming message from the server, the CCCF may check whether a manifest update signal (manifest update trigger) has been received (step 308). If such manifest update signal has been received, the CCCF may request an updated manifest (either from the location it received the original manifest from or from an URL specified in the manifest update trigger message) (step 309). After receiving the updated manifest file, the client parses it (see step 302) and updates the list of segment identifiers and associated location information.

Figure 4:
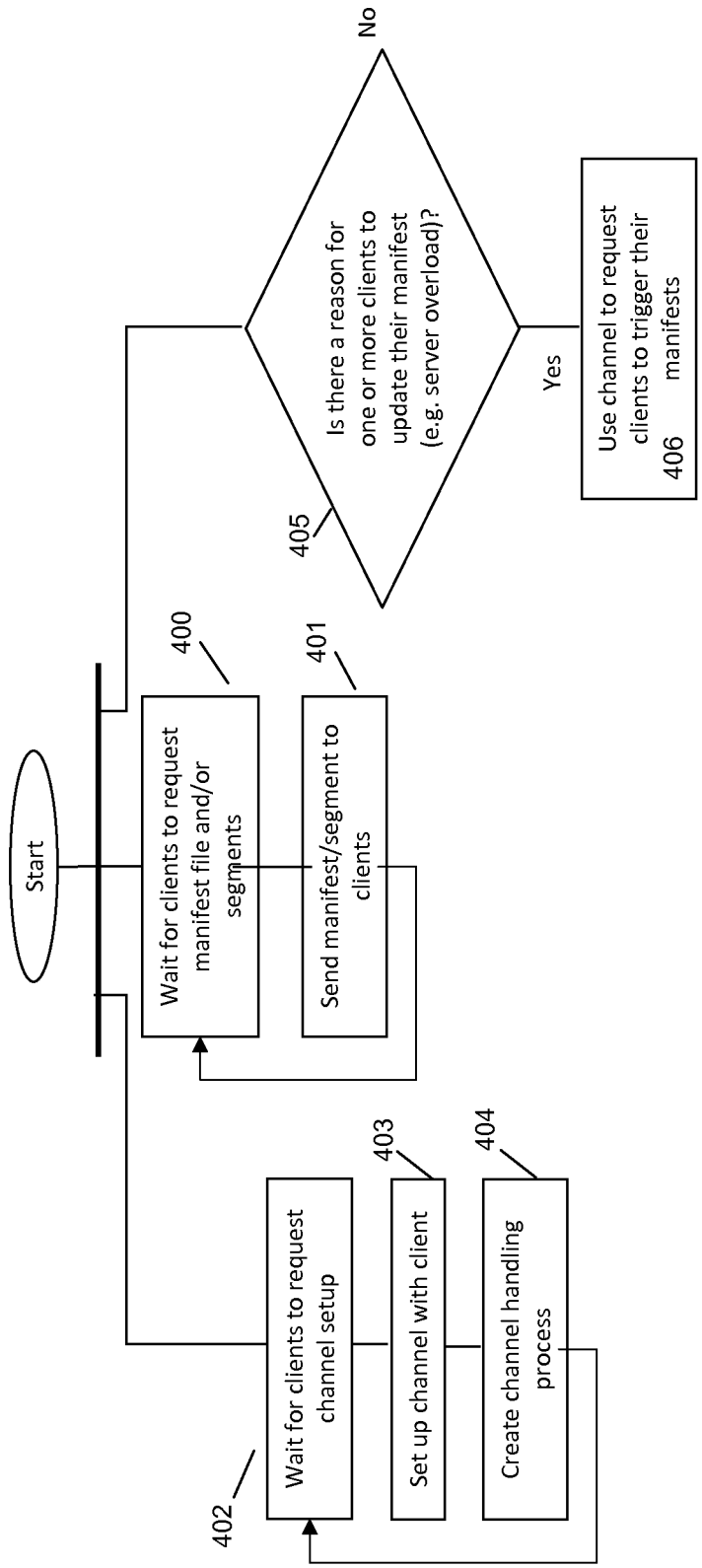
FIG. 4 depicts a sever-side process flow according to an embodiment of the invention.

FIG. 4 depicts a server-side process flow according to an embodiment of the invention. In particular, FIG. 4 depicts a process flow of processes executed on a media server for streaming segments to a client and for providing network-initiated control of the streaming using a streaming control channel. The processes may be executed by the various functions hosted on media server as e.g. described with reference to FIG. 2, i.e. a streaming server function, a control channel server function and, optionally, a load-balancing function. The functions may be configured to execute one or more processes for monitoring server load, responding to segment requests from the client and setting up and maintaining a streaming control channel with the client.

For example, a first process may be executed by an CCSF in the media server monitoring the reception of a request for a channel set-up sent by a client to the server (step 402). If such request is received, the CCSF may set-up a streaming control channel and initiate a channel handling process wherein information originating from or sent to the client, e.g. is properly processed. A second process may be executed by a media streaming server function handling the reception of requests from a client for a manifest file and/or segments (step 400). If such request is received, the server may send the requested information (segments and/or a manifest file) to the requesting client (step 401). A third process may relate to a load balancing function monitoring for network load information and/or server load information. If the load reaches or approaches a certain (maximum) threshold value, it may signal the CCSF to select one or more clients for a manifest file update (step 405). In response, the CCSF may send manifest update triggers to the selected clients (step 406).

For example, in one embodiment, the load-balance function associated with the server may signal the CCSF to initiate a manifest file update in order to reduce the processing load of the server. The updated manifest file instructs the client to continue streaming on the basis of segments of lower quality. In another embodiment, the CCSF may detect a server overload or a server failure and in response initiate a manifest file update for instructing one or more clients to retrieve segments from another network server.

The manifest update process may be realized in several ways. In one embodiment, the updated manifest file may be sent by the CCSF via the streaming control channel to the CCCF in the clients. In another embodiment, the CCSF may send a manifest file update trigger to the CCCF in the client, which in response requests an updated or new manifest file from the media server. In a further embodiment, the manifest file update trigger may comprise location information, e.g. an URL, of a further media server so that the client may request—on the basis of that location information—an updated or new manifest file from that further media server (step 406).

Figure 5A:
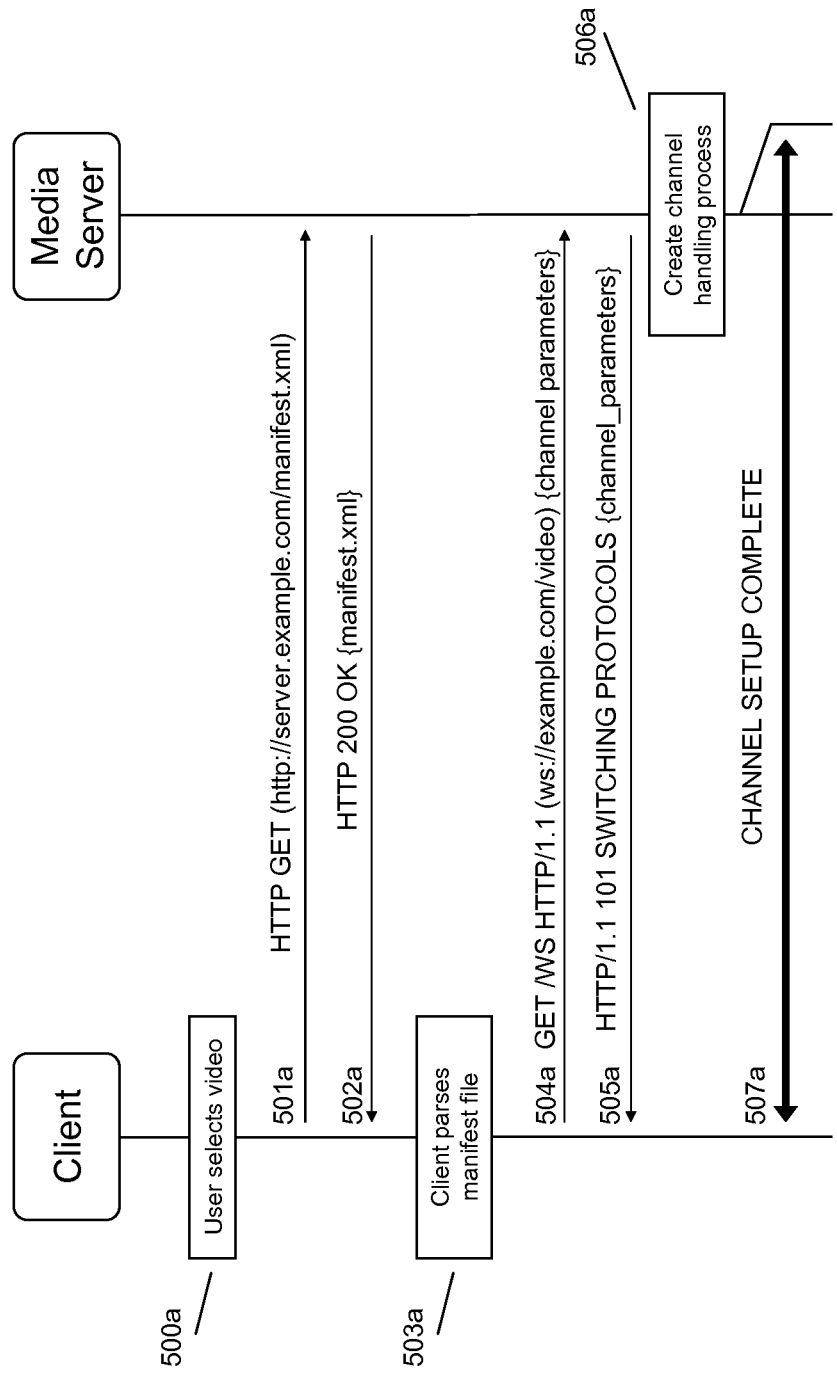
FIG. 5A-5C depict protocol flows between a client and a server according to various embodiments of the invention.
Figure 5B:
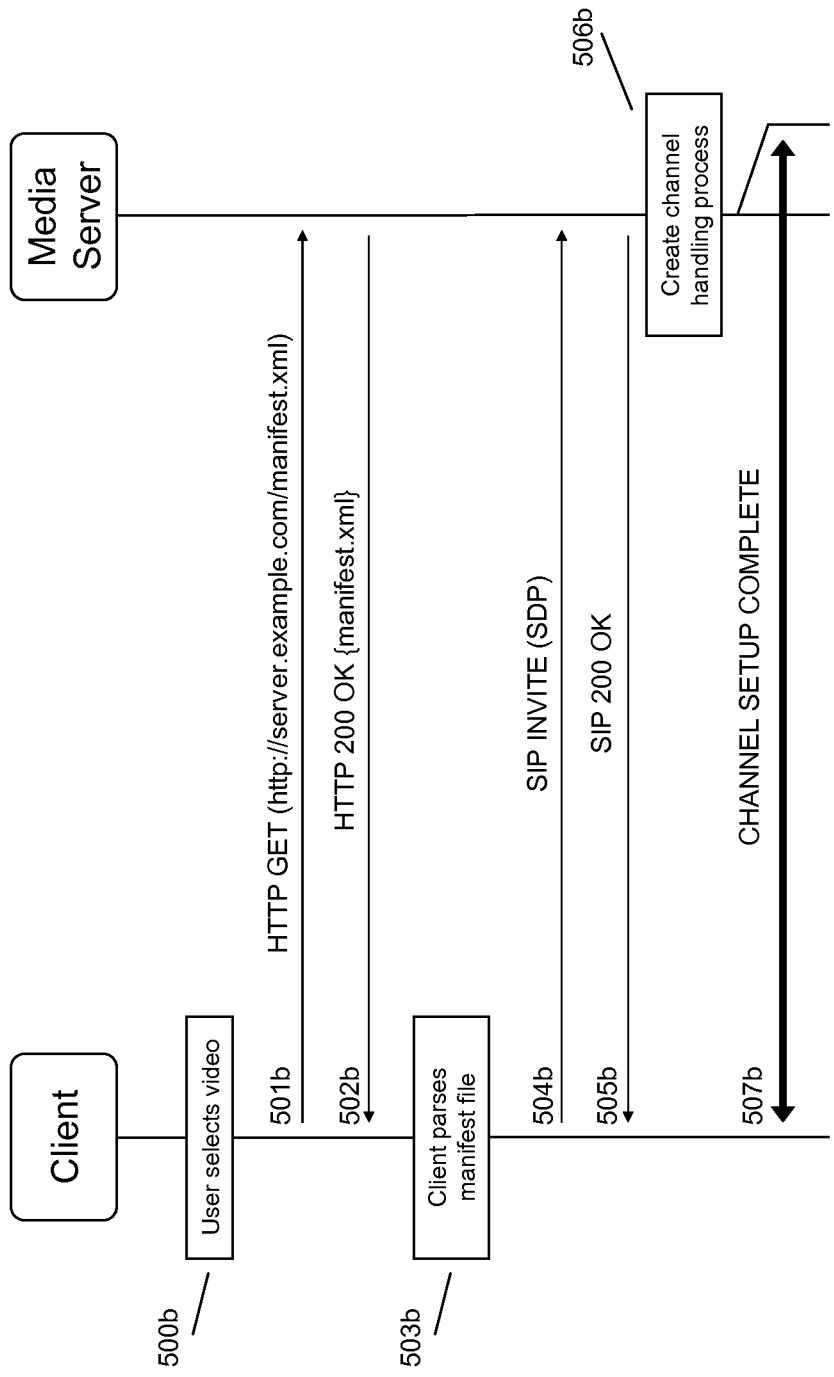
Figure 5C:
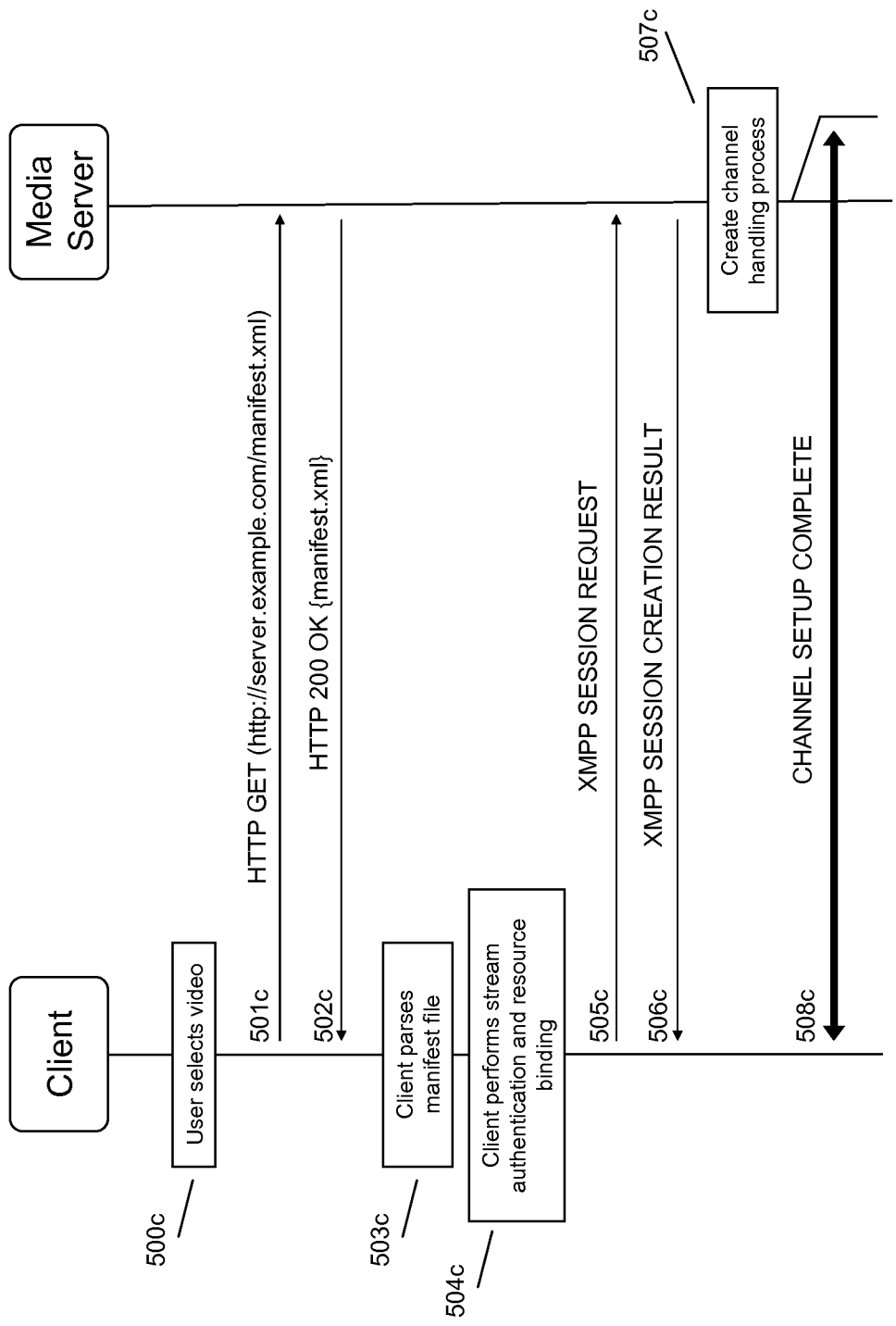

FIG. 5A-5C depict various non-limiting protocol flows for establishing a streaming control channel for enabling network-initiated streaming control. In particular, FIG. 5A depicts a message flow similar to FIG. 2, wherein the HTTP WebSocket protocol is used for setting the streaming control channel. The process may start with a user selecting a link to a video on a website wherein the URL may point (e.g. through redirection) to a manifest file (step 500a). In response, the client may send a HTTP GET request to obtain the manifest file from the server (step 501a), which is sent by the server (in this case in the form of an XML file) to the client (step 502a).

The client may parse the manifest file to obtain the locations of at least part of the segments building the video (step 503a) and use the information embedded in the manifest file to send a WebSocket setup request (HTTP GET /WS ws:// . . . ) to the server (step 504a). After performing the mandatory WebSocket handshake (as described in detail in the WS draft draft-ietf-hybi-thewebsocketprotocol-17), the server may accept the WebSocket request from the client using a HTTP 101 SWITCHING PROTOCOLS message (step 505a). Then, in order to handle incoming messages over the to be created WebSocket, the server may create a dedicated process/thread (step 506a) thereby establishing a WebSocket streaming control channel which may be used to provide server-initiated streaming control (step 507a).

The WebSocket protocol allows for full-duplex, bi-directional communication over a best-effort Internet connection. Both the server and client may send data at any time, or even at the same time over the streaming control channel. Only the data is sent without the overhead of HTTP headers thereby drastically increasing the bandwidth. Moreover, as WebSocket is an HTTP-based protocol it is usually not automatically blocked by firewalls or network address translators (NATs).

FIG. 5B depicts a message flow for setting up a streaming control channel similar to FIG. 2 using the SIP protocol. The process may start with a user selecting a link to a video on a website wherein the URL may point (e.g. through redirection) to a manifest file (step 500b). In response, the client may send a HTTP GET request to obtain the manifest file from the server (step 501b), which is sent by the server (in this case in the form of an XML file) to the client (step 502b).

The client may parse the manifest file to obtain the locations of the segments making up the video (step 503b) and use the information embedded in the manifest file to send a SIP INVITE message to the SIP Application Server (step 504b). This information may be formatted as a Session Description Protocol message [http://www.ietf.org/rfc/rfc4566.txt]. The server may accept the INVITE message and respond with a SIP 200 OK message (step 505b). Then, in order to handle incoming messages over the to be created SIP session, the server may create a dedicated process/thread (step 506b) thereby establishing a SIP-based streaming control channel which may be used to provide server-initiated streaming control (step 507b).

FIG. 5C depicts a message flow for setting up a streaming control channel similar to FIG. 2 using the XMPP protocol. The process may start with a user selecting a link to a video on a website wherein the URL may point (e.g. through redirection) to a manifest file (step 500c). In response, the client may send a HTTP GET request to obtain the manifest file from the server (step 501c), which is sent by the server (in this case in the form of an XML file) to the client (step 502c).

The client may parse the manifest file to obtain the locations of the segments making up the video (step 503c) and use the information embedded in the manifest file, such as the Jabber Identifier (JID) of the XMPP server to send an XMPP session request message in the form of one or more XML Stanzas over an XML stream to the XMPP server (step 505c). The XMPP server may accept the session request message and respond with a session creating result message (step 506c). Then, in order to handle incoming messages over the to be created XMPP session, the server may create a dedicated process/thread (step 507c) thereby establishing an XMPP-based streaming control channel which may be used to provide server-initiated streaming control (step 508c).

Figure 6:
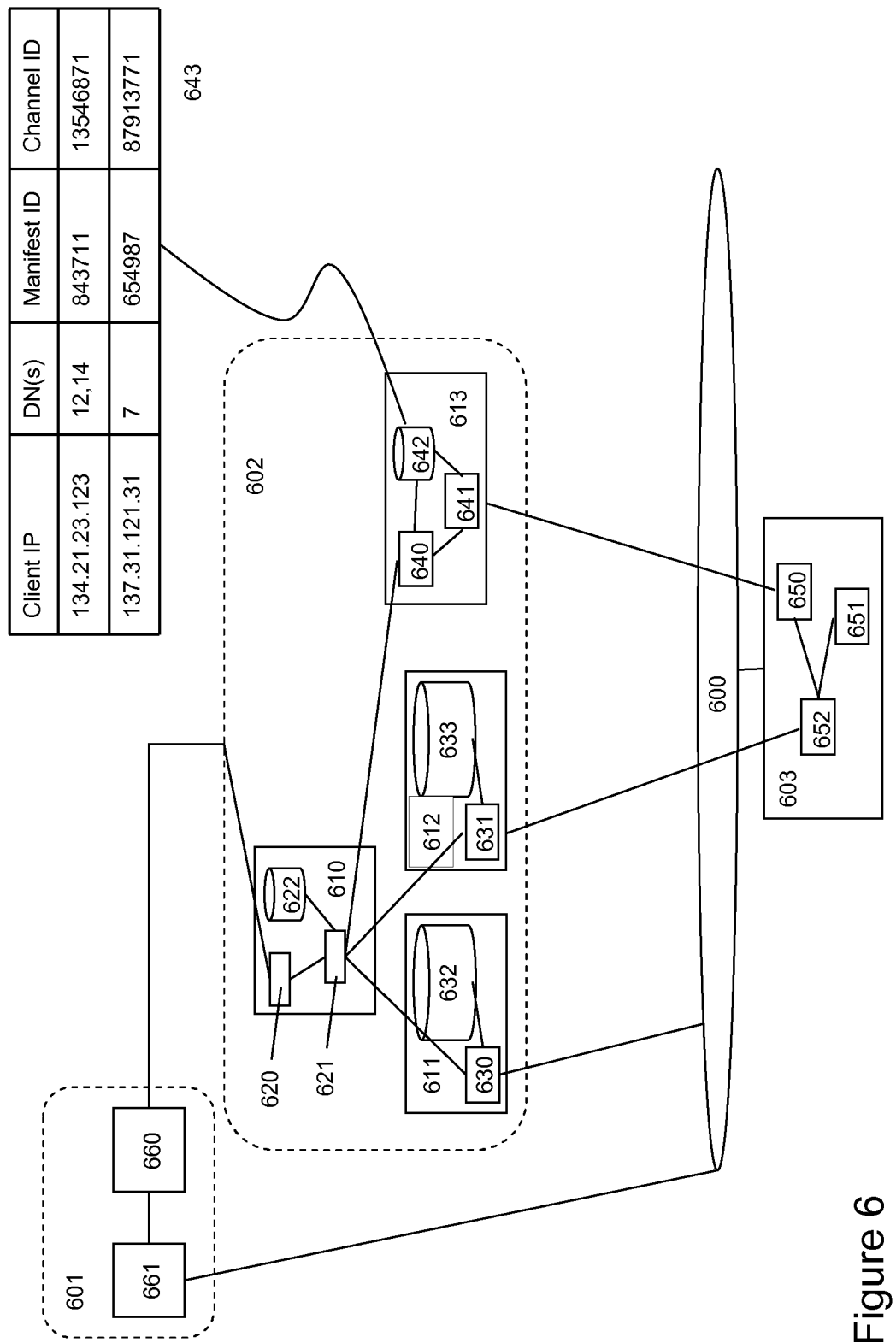
FIG. 6 depicts a content streaming system according an embodiment of the invention.

FIG. 6 depicts a content streaming system 600 for delivering segmented content to a client according to one embodiment of the invention. In particular, FIG. 6 depicts an architectural overview of a content delivery system comprising a CDN, which is configured to provide network-initiated control of streaming processes between one or more delivery nodes in the CDN and one or more clients. The network-initiated control may be realized on the basis of the streaming control channel functionality as described with reference to FIG. 2-5.

In this embodiment, the content delivery system may comprise at least one content delivery network (CDN) 602, a content source (CS) 601 connected via a transport network 600 to one or more clients 603. The content source may relate to a content provider system (CPS), a content preparation system or another CDN. A CPS may be configured to offer content, e.g. an audio item or video title, to customers, which may purchase and receive the content using a client.

The client may be implemented a software program running on a terminal, i.e. content processing device, e.g. a (mobile) content play-out device such as an electronic tablet, a smart-phone, a notebook, a media player, etc. In some embodiment, a terminal may be a set-top box or content storage device configured for processing and temporarily storing content for future consumption by a content play-out device.

A CDN may comprise delivery nodes (DN1,DN2) 611, 612 and at least one central CDN node (CCN) 610. Each delivery node may comprise or be associated with a controller 630,631 and a cache 632,633 for storing and buffering content. Each CCN may comprise or may be associated with an ingestion function (or content origin function, COF) 620 for controlling ingestion of content from an external source, e.g. a content provider or another CDN, a content location database 622 for maintaining information about where content is stored within a CDN and a CDN control function (CDNCF) 621 for controlling the distribution of one or more copies of the content to the delivery nodes and for redirecting clients to appropriate delivery nodes (a process also known as request routing). The distribution may be controlled such that throughout the CDN sufficient bandwidth for content delivery to a client is guaranteed. In one embodiment, the CDN may relate to a CDN as described in ETSI TS 182 019.

A customer may purchase segmented content, e.g. video titles, from a CPS 660 by sending a request to a web portal (WP) 661, which is configured to provide title references identifying purchasable video titles. In response to the request, a client may receive at least part of the title references from the WP and location information, e.g. an URL, of a CDNCF of a CDN, which is able to deliver the selected content.

The CDNCF may send the client location information associated with one or more delivery nodes, which are configured to deliver the selected content to the client. The segments may be hosted on one delivery node in the CDN or, alternatively, on different delivery nodes in the CDN. For example, more popular segments may be hosted on multiple delivery nodes in the CDN so that timely delivery can be guaranteed. Typically, the CDNCF may select delivery nodes in the CDN, which are best suited for delivering the selected content to the client. Criteria for selecting one or more delivery node may be based on the processing load of the delivery nodes and/or contextual information associated with the client: e.g. location of the client (the IP address) and/or the subscription of the client (e.g. a premium subscription or a normal subscription as described above with reference to FIG. 2). Hence, this way, the CDNCF may dynamically generate a manifest file, which is optimized for efficiently delivering segments to the client.

A client may contact the delivery node in the CDN using e.g. a conventional DNS system. Further, various streaming protocols may be used to deliver the content to a media streaming function 652 which processes the stream for play-out by a video play-out function 651. Such protocols may include HTTP and RTP/RTCP type streaming protocols. In a preferred embodiment an adaptive streaming protocol such as HTTP adaptive streaming (HAS) and related protocols such as Apple HTTP Live Streaming, Microsoft Smooth Streaming, Adobe HTTP Dynamic Streaming, 3GPP-DASH and MPEG Dynamic Adaptive Streaming over HTTP may be used.

The CDNs are configured to ingest and distribute segmented content. Known segmented streaming systems may be based on time segmentation, such as HTTP adaptive streaming (HAS), where content may be organized in a number of segments (pieces or parts), which may be formatted according to a known transport container format such as MPEG or AVI.

The relation between the segments may be described in a manifest file, which may be stored and identified using a specific file name extension, e.g. .mf, .xml and .m3u8. The manifest file may further describe the locations and names (segment identifiers) of the different segments on one or more delivery nodes. Segments, in particular popular segments, may be retrieved from more than one delivery node in a CDN. Moreover, in certain situations, segments should be retrieved from delivery nodes in another CDN domain. That situation will be described in more detail with reference to FIGS. 12, and 13. The CDNCF may manage the locations where segments may be retrieved. To that end, the CDNCF may use the content location database 622. In one embodiment, the content location database may relate to an Asset Location Function (ALF), as described in ETSI TS 182 019.

Further, the CDN may comprise a Delivery Continuity Node (DCN) 613 that is configured to set-up and manage streaming control channels associated with clients and to maintain a database comprising the clients and the delivery node(s) these clients are connected to. The DCN may comprise a delivery continuity management function (DCMF) 640. This function may execute a process for monitoring notifications originating from the request-routing (RR) function of the CDNCF. The DCN may further comprise a control channel server function (CCSF) 641 in the DCN for monitoring channel set-up requests from clients and to set-up a streaming control channel with a control channel client (CCCF) function 650 in the client.

Further, a delivery continuity (DC) database 642 in or associated with the DCN may store client information (e.g. its IP address) and manifest file information (i.e. segment identifiers (e.g. file names) and at least part of the delivery nodes hosting these segments). A delivery continuity management function (DCMF) may monitor for network notifications, e.g. (over)load notifications or failure notifications, originating from the CDNCF or from a separate network monitoring function in the CDN and to start a manifest file update process in response to the reception of such network notification. Details about the processes and functions in the DCN are described with reference to FIG. 8.

Although in FIG. 6 the functions in the DCN, i.e. the DCMF and the CCSF, are implemented on a separate node (the DCN), in further embodiments, these functions may be also fully or partly implemented on the CCN 610 comprising the CDNCF and the ingestion function.

Figure 7:
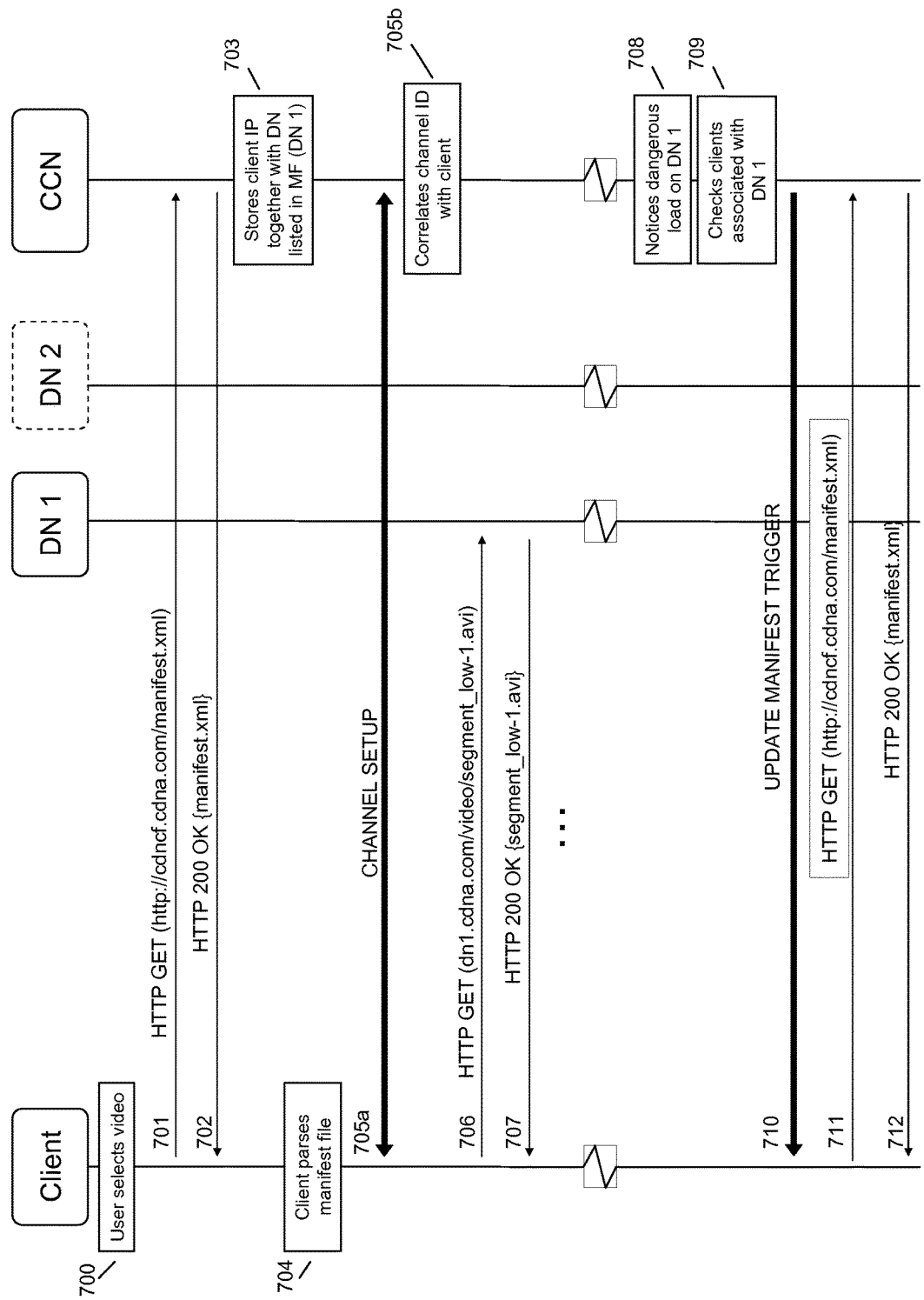
FIG. 7 depicts a message flow for use in a content streaming system according an embodiment of the invention.

FIG. 7 depicts a message flow for use in a content streaming system according to an embodiment of the invention. In particular, FIG. 7 depicts a message flow for use in a CDN-type content streaming system configured to provide network-initiated control of streaming processes between one or more delivery nodes in the CDN and one or more clients. In this embodiment, the CDN may comprise at least first and second delivery nodes (DN1, DN2) and a CCN comprising a CDNCF, DCMF and a CCSF as described with reference to FIG. 6.

The process in FIG. 7 may start with a user selecting a link to a video on a website wherein an URL may point (e.g. through redirection) to a manifest file (step 700). Upon selection, a client may send a HTTP GET request to the CDNCF to obtain the manifest file (step 701). The CDNCF may respond to the request by sending a manifest file to the client (step 702). In this case, on the basis of information from a load-balancing function, the CDNCF may select and/or generate a manifest file that contains references (e.g. segment identifiers and/or associated location information) to segments stored on a first delivery node DN1. Further, the CDNCF makes a note of the fact that it has sent the particular client (defined e.g. by its IP address) a manifest file containing references to a particular (set of) delivery node(s) (in this example delivery node DN1). To that end, the CDNCF may store client information (e.g. the IP address of the client) and manifest file information (e.g. the manifest file identifier Manifest ID), associated with at least part of a video title, and the location information of the particular (set of) delivery node(s) hosting the segments that are referenced by the manifest file in the delivery continuity (DC) database for further use (step 703).

Here, the manifest file identifier may be identified by a number and the delivery nodes may be identified by delivery nodes identifiers known within the CDN. The client may parse the manifest file to obtain the locations of the segments (e.g. URLs) making up the video (step 704). Further, the CCCF in the client may use the channel set-up information in the manifest file to setup a streaming control channel between the CCCF and the CCSF in the CDN (step 705a) (the process of setting up the streaming control channel between a CCCF and a CCSF is described with reference to FIGS. 2 and 3, and is not repeated here).

During establishment of the streaming control channel, the CCSF may correlate the channel setup request with a specific client and one or more associated delivery nodes by using the information stored in the DC database (step 705b). In particular, the CCSF may query the DC database for the client for which the streaming control channel is set up (wherein the client may be identified e.g. its IP address) and assign a unique streaming channel identifier, or Channel ID, (e.g. the port number or, in case WebSocket is used, a WebSocket ID) to the database entry belonging to the client. This way, the CCSF is able to relate a specific client-channel combination to a particular (set of) delivery node(s) and/or manifest file.

Once the streaming control channel is setup, the client may start the streaming process by requesting a first segment (in this case segment_low-1) from the first delivery node DN1 (as referred to in the manifest file) (step 706). Delivery node DN1 may respond by streaming the requested segment to the client (step 707).

During the streaming process, at some point in time, the CDNCF (comprising or associated with a load balance function for monitoring the load of delivery nodes in the CDN) may notice that the load on the first delivery node DN1 approaches a (maximum) threshold level (step 708). The CDNCF may inform the DCMF to check which clients are using the first delivery node DN1 by checking the information stored in the DC database (step 709). The DCMF may then decide to redirect some (or all) clients away from the first delivery node DN1 to another, second delivery node DN2 so that the processing load of the first delivery node D1 is reduced. To that end, the DCMF may instruct the CCSF to send a manifest update trigger over the streaming control channels of the clients selected by the DCMF (step 710) using the information in the DC database.

Upon receiving the manifest update trigger, the CCCF in the client is triggered to request a new or updated manifest file by sending a manifest request to the CDNCF (step 711)(in a similar way as described with reference to step 701). The CDNCF may receive the manifest request and select or generate a new or updated manifest file for the client and send this manifest file to the client.

In one embodiment, when generating a new or updated manifest file, the CDNCF may use information from the load-balancing function in order to select a new delivery node (see also step 702). Further, the new or updated manifest file may contain links to segments stored on the second delivery node DN2.

In one embodiment, the manifest update trigger may comprise location information, e.g. an URL, identifying a further node comprising the new or updated manifest file. In another embodiment, instead of sending a manifest update trigger to signal the client to retrieve a new or updated manifest file, the new or updated manifest file may be transmitted directly via the streaming control channel to the client. After the updated manifest file is sent back to the client, it uses the new or updated manifest file to resume streaming of segments from the second delivery node (not shown).

Since the client has received a new or updated manifest file, the CDNCF may update the manifest file information associated with that client in the DC database by performing the step as described with reference to 703. This way, if at some point in the future an overload problem occurs, the CDNCF may be able to redirect the client again to another delivery node.

Figure 8:
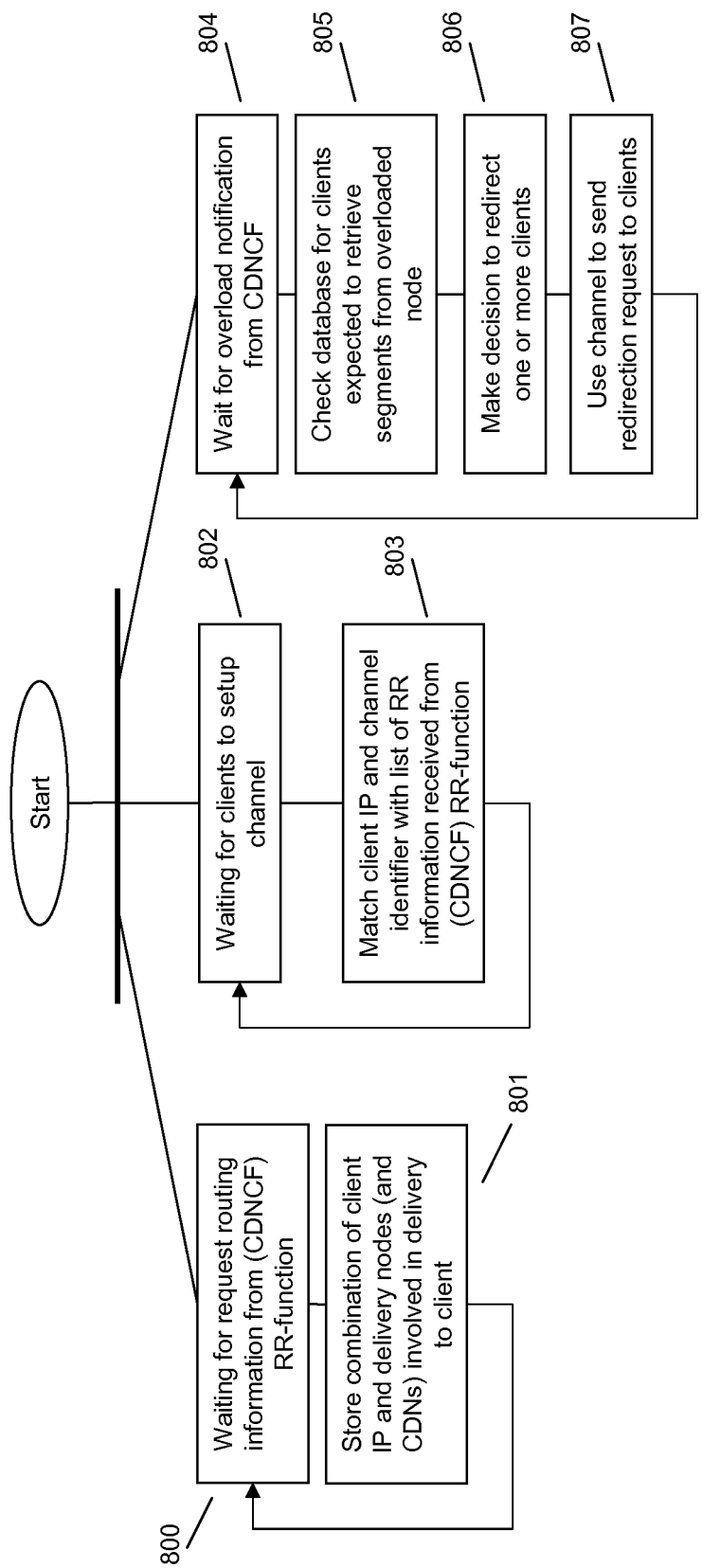
FIG. 8 depicts a process-flow associated with a Delivery Continuity Node (DCN) function according to one embodiment of the invention.

FIG. 8 depicts a process flow associated with a Delivery Continuity Node (DCN) according to one embodiment of the invention. In particular, FIG. 8 provides an overview of on or more functions that may be hosted on a Delivery Continuity Node (DCN) as described with reference to FIG. 6. The DCN may be configured to set-up and manage streaming control channels associated with clients and to maintain a table listing the clients and the delivery node(s) they are connected to. In another embodiment, all or at least part of the functions associated with a DCN may be hosted on the CCN (see FIGS. 7, 9, 11 and 13).

The DCN may comprise a delivery continuity management function (DCMF). This function may execute a process for monitoring notifications originating from the request-routing (RR) function of the CDNCF (step 800). Whenever a CDNCF sends a manifest file to a client, or redirects a client to a particular delivery node, the CDNCF may inform the DCN which delivery nodes the client is expected to retrieve segments from (i.e. the delivery nodes that are referenced in the manifest file sent the client, or the delivery node the client is redirected to). Upon receiving the notification, the DCN may add an entry into a delivery continuity (DC) database that assigns the particular client (identified by e.g. its IP address) to at least part of the delivery nodes referenced in the manifest file sent to that client (step 801).

Further, a control channel server function (CCSF) may monitor for channel set-up requests from a CCCF in a client (step 802). If it receives a request, it will start a process to set up a streaming control channel on the basis of a suitable protocol, e.g. WebSocket, SIP or XMPP.

During establishment of the streaming control channel, the CCSF may query the DC database for the client for which a streaming control channel is set up (wherein the client may be identified e.g. its IP address) and assign a unique streaming channel identifier (e.g. the port number or, in case WebSocket is used, a WebSocket ID) to the database entry belonging to the client (step 803). The DCMF may then execute a monitoring process for monitoring network notifications, e.g. network overload notifications or failure notifications from the CDNCF, a load-balancing function associated with the CDNCF (step 804) or a separate network monitoring function. In one embodiment, an overload or failure notification may include information regarding the number of clients the CDNCF wants redirect.

Once the DCMF receives an such notification (either relating to a delivery node in its own CDN or delivery node in another CDN (not shown)) from the CDNCF, it may query the DC database to check for clients that are expected to retrieve segments from the delivery node associated with the overload or failure notification (step 805). The DCMF may then select one or more clients to be redirected (step 806) (this selection may be based on the number of clients to be redirected as described above with reference to step 804). Thereafter, the DCMF may query its database in order to identify the streaming channels (using e.g. the streaming channel identifier) associated with the selected clients and send a manifest update trigger over each of these channels.

The DMCF may be further configured to monitor for messages originating from the client. In one embodiment, the DMCF may send a new or updated manifest file over the streaming control channel to the client.

Figure 9:
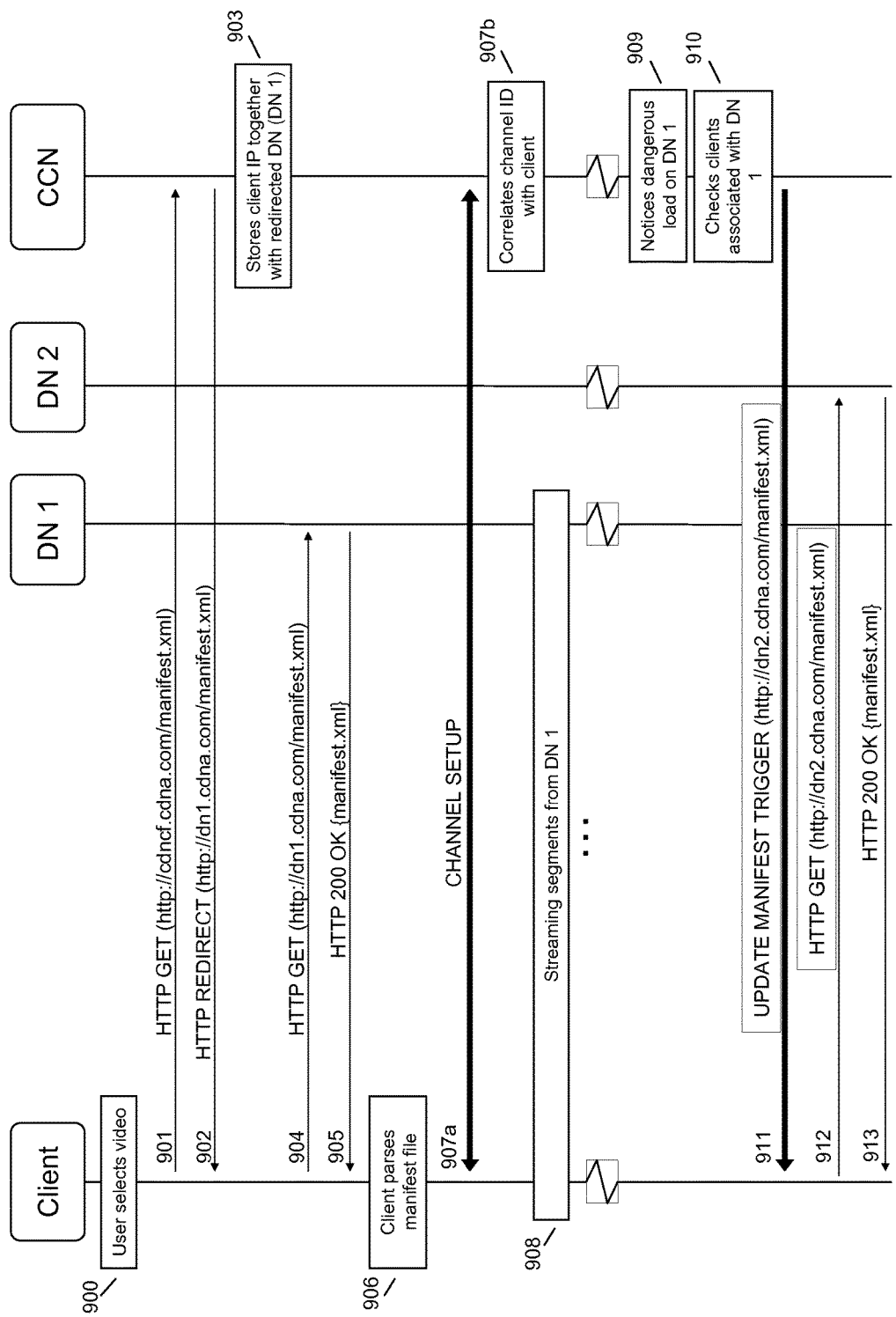
FIG. 9 depicts a message flow for use in a content streaming system according another embodiment of the invention.

FIG. 9 depicts a message flow for use in a content streaming system according another embodiment of the invention. In particular, FIG. 9 shows a message flow for use with a content delivery system similar to FIG. 7. In this embodiment however manifest files are not delivered by the CDNCF to the clients, but by the delivery nodes themselves. To that end, a delivery node, e.g. first delivery node DN1, may comprise manifest files that only comprise references to segments on that delivery node.

The process in FIG. 9 may start with a user selecting a link to a video on a website wherein the URL points (e.g. through redirection from a Content Provider) to a Request Routing (RR) function of a CDNCF (step 900). After the clients has send a HTTP GET request to the CDNCF (step 901), the RR-function of the CDNCF may select, based on e.g. information obtained from the load balancing function, a delivery node which is suitable for delivering the requested manifest file and the associated segmented content to the client. The CDNCF may then send the client a HTTP REDIRECT message containing the URL to the manifest file on the selected delivery node (in this particular example first delivery node DN1) (step 902).

When redirecting the HTTP GET request, the CDNCF may store the client information (e.g. the IP address of the client) and manifest file information (e.g. the manifest file identifier, or Manifest ID, associated with at least part of a video title, and the location information of the particular (set of) delivery node(s) hosting the segments that are referenced by the manifest file) in the delivery continuity (DC) database for further use (step 903). Here, the manifest file identifier may be identified by a number and the delivery nodes may be identified by delivery node identifiers known within the CDN.

Upon receiving the HTTP REDIRECT message from the CDNCF, the client may send a new HTTP GET message to the URL in the REDIRECT message associated with the first delivery node (step 904). The delivery node DN1 subsequently responds by sending the requested manifest file to the client (step 905).

After having received the manifest file, the client may parse the manifest file to obtain the locations of the segments making up the video (step 906). The CCCF in the client may use the channel set-up information in the manifest file to setup a streaming control channel between the CCSF and the client (step 907*a*) (The process of setting up the channel is described in FIGS. 2 and 3 and is not repeated here).

During establishment of the streaming control channel, the CCSF may correlate the channel setup request with a specific client and associated delivery notes) by using the information stored in the DC database (step 907*b*). In particular, the CCSF may query the DC database for the client for which a streaming control channel is set up (wherein the client may be identified e.g. its IP address) and assign a unique streaming channel identifier (e.g. the port number or, in case WebSocket is used, a WebSocket ID) to the database entry belonging to the client. This way, functions in the CDN can check which client/channel combinations are using which (set of) delivery node(s) (for example in this case, the CDNCF may check that the particular client is using the first delivery node DN1 and has received a specific manifest file).

Once the streaming control channel is set up (as e.g. described in FIGS. 2 and 3), the client may start requesting, receiving and playing out segments obtained from the first delivery node DN1 (step 908). During the streaming process, at some point in time, the CDNCF (which comprises or is associated with a load-balancing function for monitoring the load delivery nodes in the CDN) may notice that the load on the first delivery node DN1 reaches a predetermined (maximum) threshold level (step 909). The CDNCF may then trigger the DCMF to determine which clients are associated with the first delivery node DN1 by checking the information stored in the DC database (step 910). On the basis of this information, the DCMF may decide to redirect some (or all) clients away from the first delivery node DN1.

To that end, it may trigger the CCSF to send a manifest update trigger over the control channels of these clients (step 911). In order to make sure that clients do not receive their updated manifest from the first delivery DN1 (as a default), the manifest update trigger may include a URL associated with the new or updated manifest file (pointing for example to a second delivery node DN2). The reception of the manifest update trigger signals the client that a new manifest file should be requested. It may then send a manifest file request to the URL associated with the second delivery node DN2 referred to in the manifest update trigger (step 912). The second delivery node DN2 may respond by sending the requested manifest file to the client.

Upon receiving this manifest file, the client may continue the streaming process by requesting subsequent segments from the second delivery node DN2 instead of the first delivery node DN1 (step 913). Since the client has received a new or updated manifest file, the CDNCF may update the manifest file information associated with that client in the DC database by performing the step as described with reference to 903. This way, if at some point in the future an overload problem occurs, the CDNCF may be able to redirect the client again to another delivery node.

Hence, in the embodiment depicted in FIG. 9, a manifest file comprising the channel set-up information for setting up a streaming control channel between the client and the CCSF is stored at the delivery node where the segments are stored. This implementation provides the advantage that some of the load and complexity of the CDNCF is offloaded to the delivery nodes. In FIG. 7 the CDNCF hosts and/or generates the manifest files so that for every time a manifest file is updated load is added to the CDNCF. In certain implementations, e.g. in case for live content, client-initiated manifest updates may occur quite often, e.g. once every 30 seconds, thereby substantially increasing the load on the CDNCF. Hence, by delegating the task of responding to client-initiated manifest requests to the delivery node considerable load reduction of the CDNCF may be realized.

Figure 10:
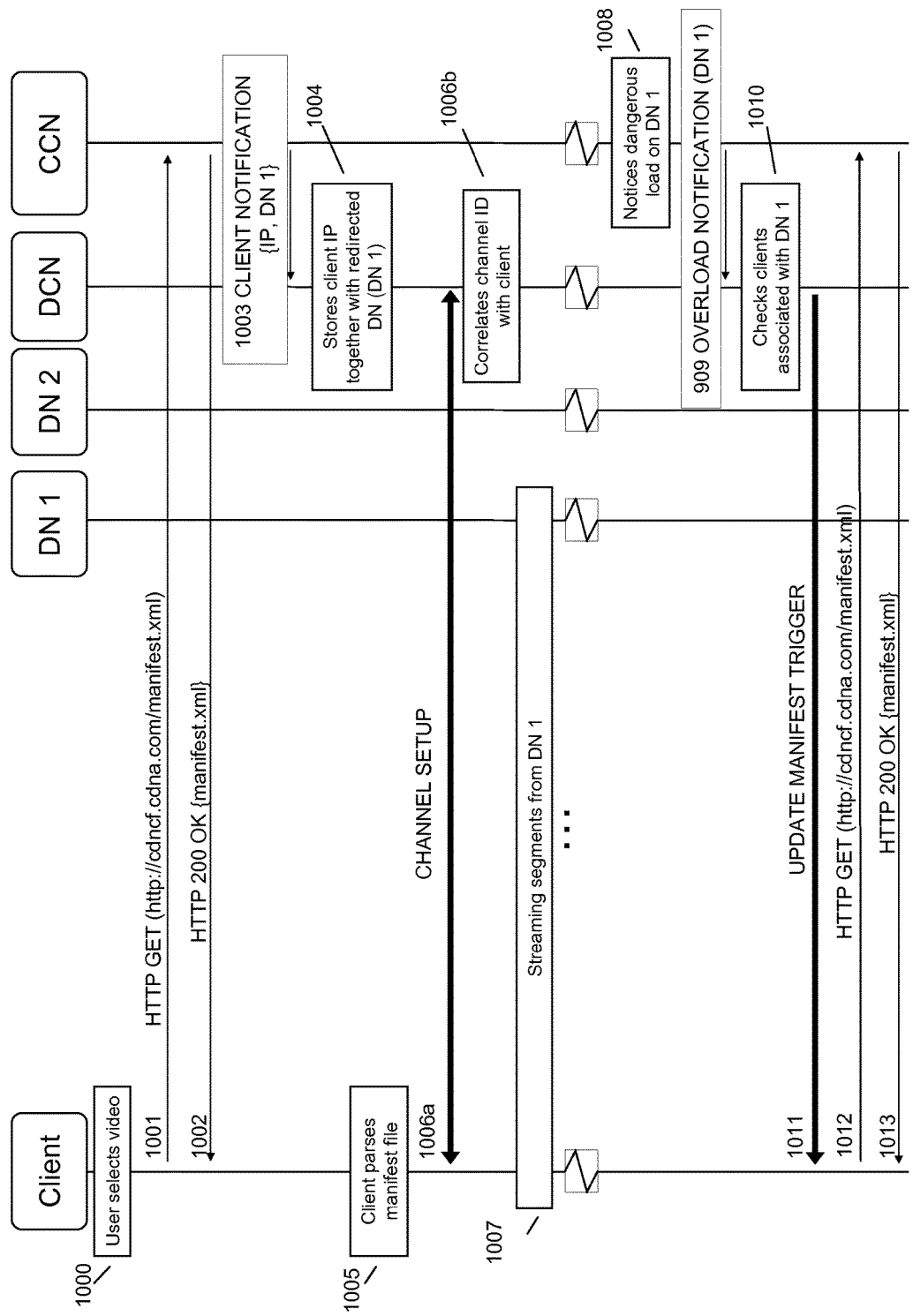
FIG. 10 depicts a message flow for use in a content streaming system according yet another embodiment of the invention.

FIG. 10 depicts a message flow for use in a content streaming system according yet another embodiment of the invention. In particular, FIG. 10 depicts a message flow similar to FIG. 7, however instead of having the DCN functionality added to the CDNCF, the DCN is located in a separate node.

The process in FIG. 10 may start with the user selecting a link to a video on a website wherein the URL may point (e.g. through redirection) to a manifest file hosted on the CDNCF (step 1000) and the transmission of a HTTP GET request by the client to obtain the manifest file from the CDNCF (step 1001). The CDNCF may respond to this request by sending the manifest file to the client. In this example, on the basis of information obtained from a load-balancing function, the CDNCF may select a manifest file that contains references to segments stored on the first delivery node DN1 (step 1002).

The CDNCF may send a notification to the DCN, in particular the DCMF in the DCN, indicating that a particular client (identified by e.g. its IP address) has been provided with a new or updated manifest file comprising references to a particular (set of) delivery node(s) (step 1003). The DCMF may store the client information (e.g. the IP address of the client) and the manifest file information (e.g. the manifest file identifier, or Manifest ID, associated with at least part of a video title, and the location information of the particular (set of) delivery node(s) hosting the segments that are referenced by the manifest file) for future use (step 1004) in the DC database. Here, the manifest file identifier may be identified by a number and the delivery nodes may be identified by delivery node identifiers known within the CDN.

The client may parse the manifest file to obtain the locations (e.g. URLs) of the segments making up the video (step 1005). Further, the client may use the channel set-up information in the manifest file to setup a channel to the DCN (step 1006a). (The process of setting up the channel is described in FIGS. 2 and 3 and is not repeated here).

During establishment of the streaming control channel, the CCSF may correlate the channel setup request with a specific client and associated (set of) delivery node(s) by using the information stored in the DC database (step 1006b). In particular, the CCSF may query the DC database for the client for which a streaming control channel is set up (wherein the client may be identified e.g. its IP address) and assign a unique streaming channel identifier (e.g. the port number or, in case WebSocket is used, a WebSocket ID) to the database entry belonging to the client. This way, functions in the CDN, e.g. the CDNCF, DCMF and the CCSF, are able to relate a specific client-channel combination to a particular (set of) delivery node(s).

Once the streaming control channel is established, the streaming client function may start requesting, receiving and playing out segments obtained from the first delivery node DN1 (step 1007). During the streaming process, the DCMF may execute a monitoring process for monitoring network notifications, e.g. network overload or failure notifications from the CDNCF, a load-balancing function associated with the CDNCF or a network monitoring function. For example, at some point in time, the CDNCF comprising or associated with a load-balancing function for monitoring the load of all delivery nodes may notice that the load on DN1 reaches a predetermined (maximum) threshold value (step 1008).

The CDNCF may then send an overload notification to the DCMF indicating that the load on the first delivery node DN1 is approaching a predetermined (maximum) threshold value. In one embodiment, an overload notification may comprise information regarding the number of clients to be redirected (step 1009). The DCMF may determine the clients that are using the first delivery node DN1 by checking the manifest file information in the DC database (step 1010).

The DCMF may then select the clients to be redirected and trigger the CCSF to send a manifest update trigger over the streaming control channels of those clients (step 1011). The reception of the manifest update trigger may signal the client to request a new manifest file by sending a manifest request to the CDNCF in a similar way as described with reference to step 1001) (step 1012).

The CDNCF may receive the manifest request and generate or select a new manifest file suitable for the client (step 1013) (e.g. by consulting the load-balancing function). In this case, the selected manifest file may for example contain links to segments stored on a second delivery node DN2. The selected manifest file may then be sent to the client. Upon receiving the new manifest file, the client may continue the streaming process by requesting subsequent segments from the second delivery node DN2 instead of the first delivery node DN1.

Since the client has received a new or updated manifest file, referring to segments hosted on a different delivery node (i.e. the second delivery node DN2 instead of the first delivery node DN1), the CDNCF may update the entry or entries in the DC database associated with the client. To do so, the CDNCF may send a notification to the DCMF in the DCN that a client has been provided with a new or updated manifest file (in a similar way as described with reference to step 1003). After receiving the notification, the DCMF may store the client information and the manifest file information in the DC database (in a similar way as described with reference to step 1004). This way the CDNCF is able to handle possible further load problems associated with the second delivery node DN2.

Hence, the embodiment depicted in FIG. 10 the functions for establishing and managing a streaming control function is implemented on a separate network node, the DCN, so that the required changes to the CDNCF in the CCN are very limited and existing CDNCF implementations can be reused, thereby limiting the cost involved when adding streaming control channel functionality to a CDN. Further, if the number of clients and associated active streaming control channels increases, only the capacity of the DCN, and not of the entire CDNCF needs to be upgraded. This embodiment thus provides a scalable solution for managing large numbers of streaming control channels associated with a CDN.

Figure 11:
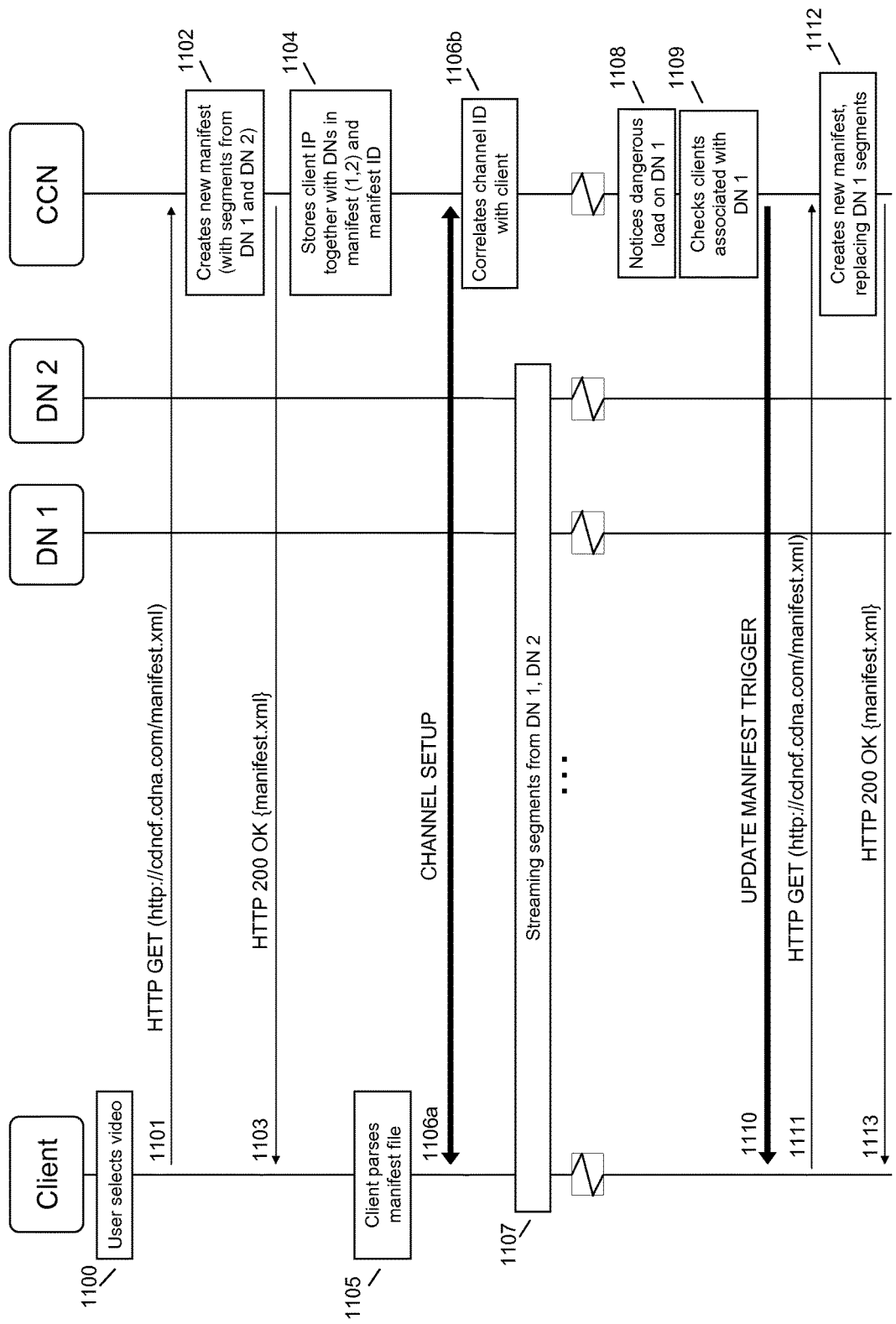
FIG. 11 depicts a message flow for use in a content streaming system according a further embodiment of the invention.

FIG. 11 depicts a message flow for use in a content streaming system according a further embodiment of the invention. In particular, FIG. 11 shows a message flow similar to FIG. 7, however instead of having each manifest file only comprising references to a single delivery node, a manifest file may contain references to multiple delivery nodes. In this embodiment, the CDNCF may be configured to create and host the manifest file.

The process may start with a user selecting a link to a video on a website wherein the URL points (e.g. through redirection) to a manifest file (step 1100) and transmission of a HTTP GET request by the client to obtain the manifest file from the CDNCF (step 1101). Having received the manifest request from the client, the CDNCF may create a new manifest file or select an existing one that comprises references to segments on different delivery nodes (1102). For example in one embodiment, the manifest file may comprise a reference to low-quality segments hosted on a first delivery node DN1, and to high quality segments hosted on a second delivery node DN2. The CDNCF may use load information (generated by a load-balancing function) associated with the delivery nodes in the CDN and, optionally, the location information of the client (e.g. the IP address) in order to select delivery nodes, which are best suited for delivering (part of) the requested segments to the client. In this case, the manifest file may comprise references to at least a first delivery node DN1 and a second delivery node DN2.

The CDNCF may send the manifest file to the client (step 1103) and store the client information (e.g. its IP address) and the manifest file information (e.g. the IP address of the client) and manifest file information (e.g. the manifest file identifier, or Manifest ID, associated with at least part of a video title, and the location information of the particular (set of) delivery node(s) hosting the segments that are referenced by the manifest file), in this case first and second delivery node D1 and D2) in the DC database (step 1104). Here, the manifest file identifier may be identified by a number and the delivery nodes may be identified by delivery node identifiers known within the CDN.

The client may parse the manifest file to obtain the locations of the segments making up the video (step 1105) and use the channel set-up information in the manifest file to setup a streaming control channel between the client and the CCSF (step 1106a). (The process of setting up the channel is described in FIGS. 2 and 3, and is not repeated here.)

During establishment of the streaming control channel, the CCSF may correlate the channel setup request with a specific client and associated (set of) delivery node(s) by using the information stored in the DC database (step 1106b). In particular, the CCSF may query the DC database for the client for which a streaming control channel is set up (wherein the client may be identified e.g. its IP address) and assign a unique streaming channel identifier (e.g. the port number or, in case WebSocket is used, a WebSocket ID) to the database entry belonging to the client. This way, the functions in the CDN may relate a specific client-channel combination to a particular (set of) delivery node(s).

Once the streaming control channel is set up, the client may start the streaming process by requesting, receiving and playing out segments originating from the first and second delivery node (step 1107). During the streaming process, at some point in time, the CDNCF comprising or associated with a load-balancing function for monitoring the load of delivery nodes within the CDN, may notice that the load on the first delivery node DN1 reaches or approaches a predetermined (maximum) threshold value (step 1108). The CDNCF may then trigger the DCMF to check which clients are associated with the first delivery node DN1 by checking the manifest file information in the DC database (step 1109). The DCMF may then determine which clients require a manifest update and trigger the CCSF to send a manifest update trigger over the control channels of those clients (step 1110).

The manifest update trigger may signal the client that it needs to request a new or updated manifest file (step 1111) by sending a manifest request to the CDNCF (see step 1101). The CDNCF receives the manifest request and creates or selects a new manifest file suitable for the client (see step 1102) (step 1012). In this case, the new or updated manifest file may for example replace the URLs associated with the first delivery node DN1 with URLs associated with another delivery node DN hosting the same segments (e.g. third delivery node DN3). The URLs associated with delivery node DN2 are not replaced since only the first delivery node DN1 was in danger over becoming overloaded. The CDNCF may send the new or updated manifest file to the client (step 1113), which may update its (internal) list of segments and continue the streaming process by requesting segments listed in the new or updated manifest.

Since the client has received a new or updated manifest file, the CDNCF may update the manifest file information associated with that client in the DC database by performing the step as described with reference to 1104. This way, if at some point in the future an overload problem occurs, the CDNCF may be able to redirect the client again to another delivery node.

Hence, the embodiment depicted in FIG. 11 provides the advantage that segments referenced by a single manifest can be distributed over multiple delivery nodes, where each delivery node hosts only a subset of all the segments. One advantage of this is that it allows a CDN to distinguish between different types of segments. In segmented content certain segments are more popular (more often requested) than other segments. For example in a temporal segmented video title, earlier segments are typically more often requested than the later segments. In another example, a video title may have segments related to different video qualities, where some qualities will be more popular than other. In such case, a CDN might host the more popular segments at more delivery nodes than the less popular segments, providing for additional scalability and higher efficiency.

Figure 12:
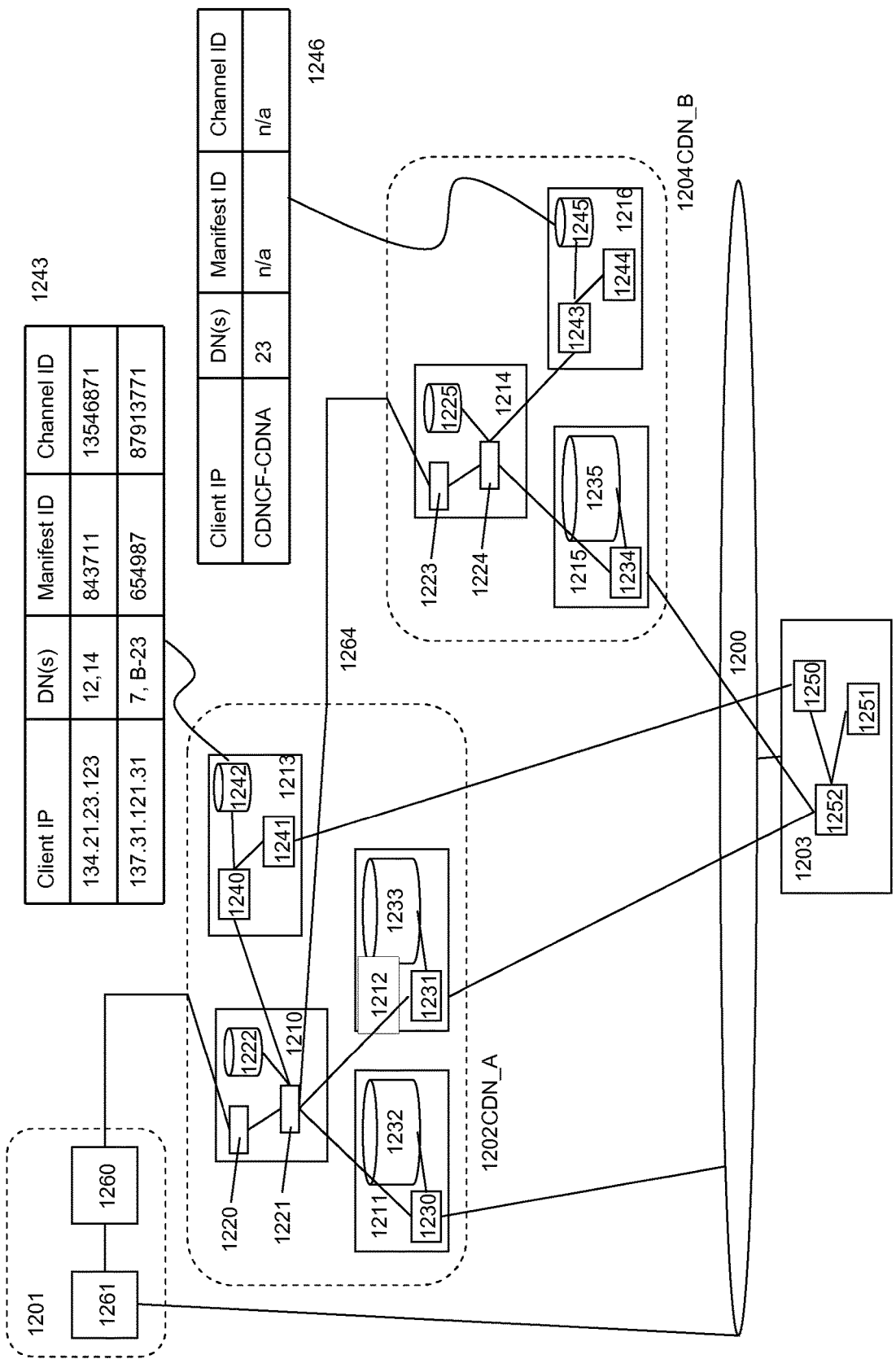
FIG. 12 depicts a content streaming system according an embodiment of the invention.

FIG. 12 depicts a content streaming system according another embodiment of the invention. In particular, FIG. 12 illustrates a CDN-based content delivery system which is similar to the one described with reference in FIG. 6. In this embodiment however the system comprises at least two interconnected CDNs. In particular, the content streaming system comprises a first CDN 1202 (also referred to as the upstream CDN) interconnected via an CDN interconnect interface 1264 to at least a second CDN 1204 (also referred to as the downstream CDN) wherein each CDN is configured to provide network-initiated control of streaming processes between one or more delivery nodes in the CDN and one or more clients. The network-initiated control may be realized on the basis of the streaming control channel functionality as described with reference to FIG. 2-5.

The content delivery system may further comprise at a content source 1201 connected via a transport network 600 to one or more terminals 1204 hosting a client 1203. The content source may relate to a content provider system CPS, a content preparation system or another CDN. A CPS may be configured to offer content, e.g. a video title, to customers, which may purchase and receive the content using a client which comprises a media streaming function 1252 which processes the stream for play-out by a video play-out function 1251.

Similar to FIG. 6, a CDN may comprise delivery nodes 1211,1212,1215 and at least one CCN 1210,1223. Each delivery node may comprise or be associated with a controller 1230,1231,1234 and a cache 1232,1233,1235 for storing and buffering content. Each CCN may comprise or may be associated with an ingestion node (or content origin function, COF) 1220,1223 for controlling ingestion of content from an external source, e.g. a content provider or another CDN, a content location database 1222,1225 for maintaining information about where content is stored within a CDN and a CDN control function (CDNCF) 1221,1224 for controlling the distribution of one or more copies of the content to the delivery nodes and for redirecting clients to appropriate delivery nodes (a process also known as request routing). A customer may purchase content, e.g. video titles, from a CPS 1260 by sending a request to a web portal (WP) 1261, which is configured to provide title references identifying purchasable content items in a similar way as described with reference to FIG. 6.

The CDNCF may manage the locations where segments may be retrieved using the content location database 1222, 1225. Further, a CDN may comprise a Delivery Continuity Node (DCN) 1213,1216 that is configured to set-up and manage streaming control channels associated with clients and to maintain a database comprising client information and manifest file information the delivery node(s) these clients are connected to. The DCN may be configured as a stand-alone DCN or integrated in a CDNCF.

The DCN may comprise a delivery continuity management function (DCMF) 1240,1243 for monitoring notifications originating from the request-routing (RR) function of the CDNCF, a control channel server function (CCSF) 1241,1244 monitoring for channel set-up requests from clients and to set-up a streaming control channel with a control channel function 1250 in the client; and, a delivery continuity (DC) database 1242,1245 in or associated with the DCN for storing client information (e.g. IP address of a client) and manifest file information (i.e. segment identifiers (e.g. file names) and location information (e.g. URLs) associated with at least part of the delivery nodes hosting these segments).

The DCMF may monitor for network notification, e.g. overload or failure notifications originating from the request-routing (RR) function of the CDNCF, a separate overload-function in the CDN or a network monitoring function, and to start a manifest file update process in response to the reception of such notification. The details of the manifest file update process will be described hereunder in more detail with reference to FIG. 13.

In the content delivery system of FIG. 12, the upstream CDN may outsource part of the delivery of segments to a client to the downstream CDN. For example, in one embodiment, low-quality segments may be located and delivered by a first CDN A (configured e.g. for delivery of content to mobile devices) and high quality segments may be located and delivered by a second CDN B (configured e.g. for delivery of high-quality segments to home media devices supporting HDTV technology).

When outsourcing part of the delivery of the segments to a downstream CDN, the upstream CDN (or in particular the CDNCF of the upstream CDN) may start a process for generating a manifest file comprising references to one or more delivery nodes in the first CDN A and references to one or more delivery nodes in the second CDN B. Such manifest file may be referred to as an inter-CDN manifest file. The inter-CDN manifest file may further comprise channel set-up information for setting up a streaming control channel between the client and the upstream CDN A.

During the process of generating the inter-CDN manifest file, information may be exchanged between CDNs via interconnection interface 1264. In particular, during the generation of the inter-CDN manifest file, the upstream CDN may request the downstream CDN for location information regarding one or more segments which where outsourced to the downstream CDN. In response, the downstream CDN may select a delivery node hosting the requested segments on the basis of contextual information regarding the client. For example, the downstream CDN may select a delivery node, which is geographically closest to the location of the client. This information is subsequently sent to the CDNCF of the upstream CDN for generation of the inter-CDN manifest file. Hence, the content delivery system in FIG. 13 is configured to dynamically generate a "personalized" inter-CDN manifest file.

Once an inter-CDN manifest file is generated and forwarded to a client, the control channel function in the client, may set up a streaming control channel with the CCSF in the DCN of the upstream CDN using the channel set-up information in the inter-CDN manifest file and start requesting and play-out segments.

During the streaming process, the DCMF may receive an network notification, e.g. an (over)load notification or failure notification, from the CDNCF and determine that the client should be redirected to one or more other delivery nodes. A network notification may be related to a network problem situation in the upstream CDN or downstream CDN. In the latter case, the CDNCF of the downstream CDN may send an network notification via the interconnect interface 1264 to CDNCF of the upstream CDN.

Figure 13:
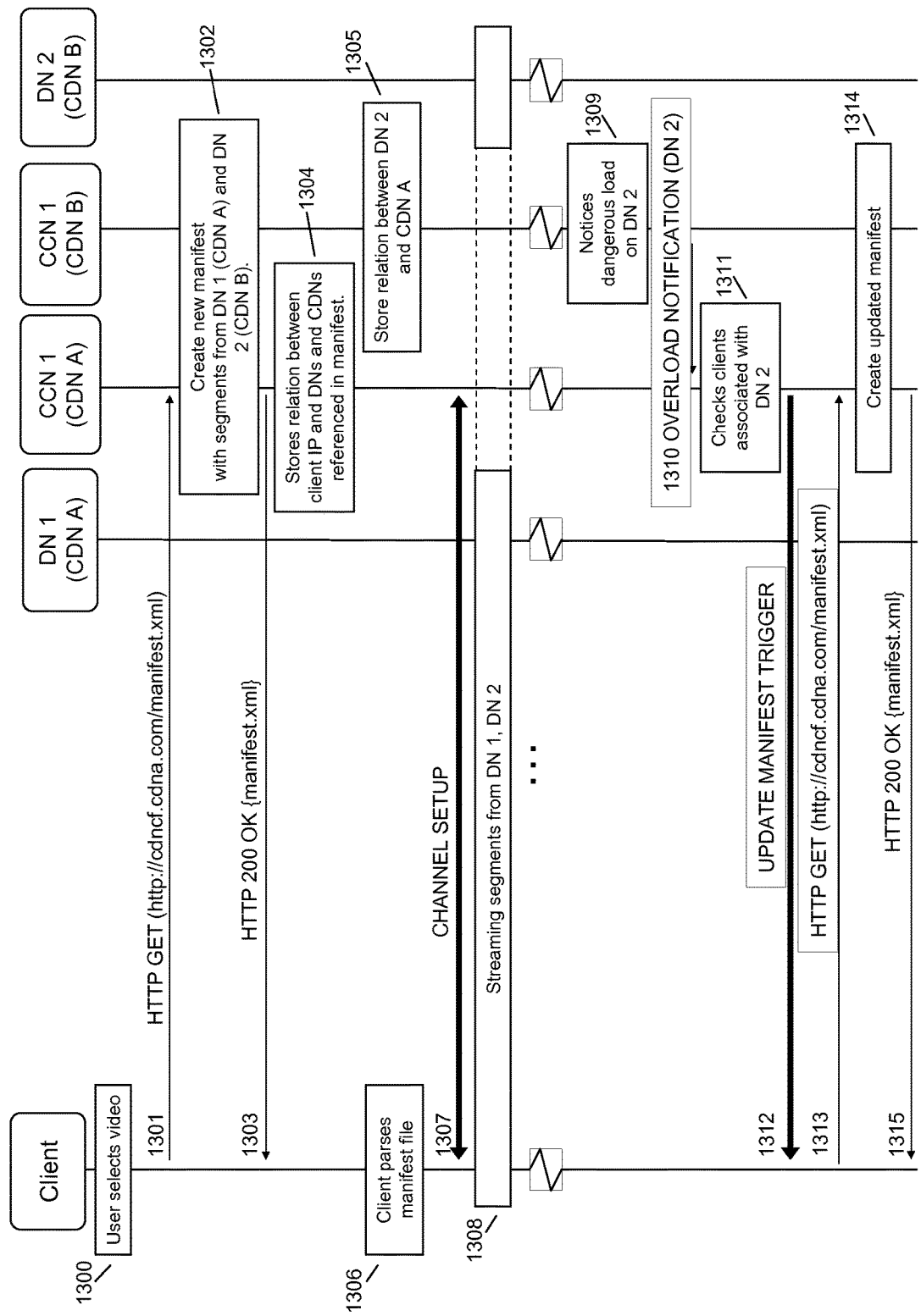
FIG. 13 depicts a message flow for use in a content streaming system according yet a further embodiment of the invention.

FIG. 13 depicts a message flow for use in a content streaming system according yet a further embodiment of the invention. In particular, FIG. 13 shows a message flow for use in a content delivery network as depicted in FIG. 12, wherein the manifest file may comprise references to segments hosted on different delivery nodes associated with different CDNs.

The process may start with a user selecting a link to a video on a website wherein the URL points (e.g. through redirection) to a manifest file hosted on a first CDNCF associated with a first CDN A (step 1300). This CDN may also be referred to as the upstream CDN. Upon selection, the client may send a HTTP GET request to obtain the manifest file from the CDNCF of CDN A (step 1301).

After having received the manifest request from the client, the first CDNCF may start a process for creating a new manifest file or updating an existing manifest file, wherein the manifest file may comprise references to segments on different delivery nodes associated with different CDNs (step 1302). For example, in one embodiment, low-quality segments may be located and delivered by a first CDN A (configured e.g. for delivery of content to mobile devices). This CDN may be referred to as the upstream CDN. Further, high quality segments may be located and delivered by a second CDN B (configured e.g. for delivery of high-quality segments to home media devices supporting HDTV technology). This CDN may be referred to as the downstream CDN. A manifest file comprising references to at least a first delivery node DN1 associated with first CDN A and a second delivery node DN2 associated with CDN B may be referred to as an inter-CDN manifest file. The inter-CDN manifest file may further comprise channel set-up information for setting up a streaming control channel between the client and the first CDNCF associated with upstream CDN A.

In one embodiment, an inter-CDN manifest file may be generated on the basis of a process wherein the first CDNCF of the upstream CDN A requests the second CDNCF of the downstream CDN B to provide references to locations of a predetermined number of segments which should be delivered to the client by CDN B.

The first CDNCF may then send the inter-CDN manifest file to the client (step 1303) wherein the first CDNCF may store client information (e.g. its IP address) and manifest file information, comprising the manifest file identifier, or Manifest ID, associated with at least part of a video title, and the location information of the particular (set of) delivery node(s) hosting the segments that are referenced by the manifest file) associated with the first CDN A and a (particular set of) delivery node(s) associated with the second CDN B, in the DC database associated with the first CDNCF (step 1304). Here, the segments may be identified by a file name and the delivery nodes may be identified by delivery node identifiers. Here, the manifest file identifier may be identified by a number and the delivery nodes may be identified by delivery node identifiers known within the CDN.

Hence, during the generation of the inter-CDN manifest file, communication between the first and second CDNCF takes place so that—although the second CDNCF is not aware of all segments in the inter-CDN manifest file—, the second CDNCF is aware that a predetermined number of segments located on a (particular set of) its delivery node(s) may be requested by a client in the (near) future. Therefore, the second CDNCF may store inter-CDN information comprising the delivery nodes in the downstream CDN (in this example the second delivery node DN2) together with a reference to the upstream CDN (in this case the first CDNCF) in the DC database associated with second CDN B so that it is able to notify any network problems, e.g. load or failure problems with on of these delivery nodes to the first CDNCF (step 1305).

The client may parse the inter-CDN manifest file in order to obtain the locations of the segments making up the video (step 1306) and use the channel set-up information in the manifest file to setup a streaming control channel between the first CDNCF and the client (step 1307) (The process of setting up the channel is described in FIGS. 2 and 3, and is not repeated here.)

During establishment of the streaming control channel, the CCSF associated with the first CDN1 may correlate the channel setup request with a specific client and associated (set of) delivery node(s) by using the information stored in the first DC database (step 1309). In particular, the CCSF may query the DC database for the client for which a streaming control channel is set up (wherein the client may be identified e.g. its IP address) and assign a unique streaming channel identifier (e.g. the port number or, in case WebSocket is used, a WebSocket ID) to the database entry belonging to the client. This way, functions in the first CDN1 are able to relate a specific client-channel combination to a particular (set of) delivery node(s). After establishment of the streaming control channel, the client may start the streaming process by requesting, receiving and playing out segments obtained from both the first delivery node DN1 associated with the first (upstream) CDN A and the second delivery node DN2 associated with the second (downstream) CDN B (step 1308).

During the streaming process, at some point in time, the second CDNCF, which is monitoring its own delivery nodes, may notice a network problem, e.g. a network failure in the second delivery node DN2 or that the load on the second delivery node DN2 reaches or approaches a predetermined (maximum) threshold value (step 1309). Then, on the basis of the inter-CDN information in the DC database, the second, CDNCF may notify the network problem to the first CDNCF by sending a network notification, e.g. an (over) load notification or a failure notification to the first CDNCF. The overload notification may signal the first CDNCF that at least part of the references to the delivery nodes in the second CDN, in particular references to the delivery nodes listed in the inter-CDN manifest file, need to be updated (step 1310).

Hence, upon receiving a network notification from the second CDNCF, the first CDNCF trigger the DCMF to check which clients have been sent an inter-CDN manifest file that contains references to the second delivery node DN2 (step 1311) on the basis of the manifest file information stored in the DC database associated with the first CDN A. The DCMF may then determine which clients to redirect and to trigger the CCSF to send a manifest update trigger via the control channels of the clients, which need to be redirected (step 1312). Upon receiving the manifest update trigger, the client will request a new manifest file (step 1313) by sending a manifest file request to the first CDNCF (similar to step 1301).

The first CDNCF receives the manifest request and will generate a new or an updated manifest file suitable for the client (step 1314) in cooperation with the second CDNCF in a similar ways as described above with reference to step 1302. For example, in one embodiment, the second CDNCF may replace the URLs referring to the (almost) overloaded delivery nodes in the second CDN (in this case the second delivery node) with URLs to another delivery node, e.g. a fourth delivery node DN4 hosting the same segments, and send these references to the first CDNCF. The URLs referring to the delivery node DN1 in the first CDN A are not replaced since for that delivery node no overload signalling was received by the first CDNCF. The first CDNCF may send the updated inter-CDN manifest file to the client (step 1315), which may update it internal list of segments on the basis of the updated manifest file and continue streaming by requesting requests the subsequent segments from the URLs listed in the new manifest.

Since the client has received a new or updated manifest file, the first CDNCF may update the manifest file information associated with that client in the DC database by performing the step as described with reference to 1304. Furthermore, the second CDNCF may update the inter-CDN information comprising the delivery nodes in the downstream CDN (in this example the fourth delivery node DN4) together with a reference to the upstream CDN (in this case the first CDNCF) in the DC database associated with second CDN B in a similar was as described with reference to step 1305. This way, if at some point in the future an overload problem in CDN B occurs, the second CDNCF may be able to redirect the client again to another delivery node.

Hence, the embodiment depicted in FIG. 13 provides the advantage that it allows for segmented content to be distributed over multiple CDNs, where each CDN hosts only a subset of all segments. This embodiment provides the same type of advantages as discussed in reference to FIG. 11, however in this case different delivery nodes may be distributed over multiple CDNs. One further advantage of this is that it allows an upstream CDN to outsource some workload to another downstream CDN. This embodiment further allows the use of specialized CDNs. For example, in one embodiment a first CDN may be configured and optimized for delivery to mobile devices, hosting mostly lower quality segments, while a second CDN may be configured and optimized for delivery to HD play-out device, hosting mostly higher quality segments.

It is submitted that in the above-described CDN embodiments, instead of sending an update manifest trigger to a client which responses by requesting an updated or new manifest file, (part of) the new or updated manifest file may be sent directly to the client via the streaming control channel to the client.

FIG. 14 depicts a manifest file according to one embodiment of the invention. In particular, FIG. 14 shows an embodiment of a manifest file comprising references, e.g. URLs, to a delivery node configured to delivery a particular set of segments. In this particular example, the manifest file may comprise references to two different sets of segments, e.g. low and high-bitrate segments, related to the same content stored at a delivery node. The manifest file may further comprise channel set-up information. In one embodiment, the channel set-up information may comprise a channel target parameter 1400 providing a reference to the network node comprising a streaming control function (or in the CDN case a control channel server function). Further, in another embodiment, the channel set-up information may comprise channel parameters 1402, i.e. parameters used by the streaming control function/control channel server function. For example, in the case of WebSocket the parameters may refer to the use of WebSocket sub-protocols, WebSocket version, etc.

It is to be understood that any feature described in relation to any one embodiment may be used alone, or in combination with other features described, and may also be used in combination with one or more features of any other of the embodiments, or any combination of any other of the embodiments. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. The invention is not limited to the embodiments described above, which may be varied within the scope of the accompanying claims.

What is claimed is:

1. Method for enabling network-initiated control of streaming of segmented content from a delivery node to at least one client, said method comprising:
   receiving a first manifest file comprising one or more segment identifiers and location information for locating one or more content delivery nodes configured to transmit one or more segments associated with said one or more identifiers to said at least one client;
   providing the client with channel set-up information; and,
   establishing, preferably in response to the reception of said first manifest file at the client, at least one streaming control channel between said at least one client and a control channel server function associated with said delivery node on the basis of said provided channel set-up information, said at least one client being configured for receiving at least one manifest file update message via said streaming control channel.

2. Method according to claim 1, comprising:
   monitoring said streaming control channel for at least one manifest file update message.

3. Method according to claim 1, comprising:
   detecting a manifest file update message;
   retrieving at least part of a second manifest file in response to the detection of said manifest file update message;
   and, optionally, requesting a segment stream or file on the basis of said second manifest file.

4. Method according to claim 1, wherein at least part of said channel set-up information is provided to said client in said first manifest file, preferably said channel set-up information comprising server location information, preferably at least one URL, for locating said control channel server function in the network.

5. Method according to claim 1 wherein said manifest file update message comprises at least part of a second manifest file or wherein said manifest file update message comprises manifest file location information, preferably at least one URL, for locating and requesting at least part of said second manifest file.

6. Method according to claim 1 wherein said segmented content is delivered to said at least one client on the basis of a streaming protocol, preferably an HTTP-based streaming protocol or derivatives thereof; and/or, wherein said streaming control channel is established on the basis of a WebSocket protocol, a SIP protocol, an XMPP protocol and/or combinations thereof.

7. Method for enabling network-initiated control of streaming of segmented content from a delivery node to at least one client, said method comprising:
   delivering a manifest file comprising one or more segment identifiers and location information for locating one or more content delivery nodes configured to transmit one or more segments associated with said one or more identifiers to said at least one client to at least one client;
   receiving a request for setting up a streaming control channel between a control channel server function associated with said one or more content delivery nodes and said at least one client; and,
   establishing said at least one streaming control channel, wherein said control channel server function is configured to transmit at least one manifest file update message to said client.

8. Method according to claim 7, wherein at least a first part of said one or more delivery nodes is configured as first delivery nodes associated with a first content delivery network (CDN1) configured to deliver at least a first part of said segments to said client; and/or, at least a second part of said delivery nodes is configured as second delivery nodes associated with a second content delivery network (CDN2) configured to deliver at least a second part of said segments to said client.

9. Method according to claim 8, comprising:
   determining an overload, an impending overload, a failure or a network configuration change associated with one or more of said first and/or second delivery nodes;
   identifying one or more clients retrieving or expecting to retrieve at least one segment from said one or more first and/or second delivery nodes associated with said determined overload, impending overload, failure or network configuration change;
   determining one or more streaming control channels associated with at least part of said identified clients; and
   transmitting a manifest file update message to at least part of said identified clients over said one or more streaming control channels.

10. Method according to claim 9, wherein said at least part of said overload, impending overload, failure or network configuration change is associated with at least one of said second delivery nodes belonging to a second CDN2, said method comprising:

said second CDN2 transmitting an overload, failure or network configuration change notification to said first CDN1, said notification comprising one or more second delivery node identifiers associated with said overload, failure or network configuration change.

11. Method according to claim 7 comprising:

monitoring one or more network parameters, preferably at least one of said one or more network parameters associated with an overload, an impending overload, a failure, or a network configuration change associated with said one or more delivery nodes;

generating a manifest file update message if one or more predetermined conditions associated with said network parameters are met; and, transmitting said manifest file update message to said at least one client.

12. A content processing device comprising a client for controlling reception of segmented content transmitted from at least one delivery node, said first delivery node being associated with a first control channel server function, said client being configured for:

transmitting to said at least one delivery node a request for delivering segmented content;

receiving a manifest file comprising one or more segment identifiers and location information for locating one or more content delivery nodes configured to transmit one or more segments associated with said segment identifiers to said at least one client;

being provided with channel set-up information; and, establishing a streaming control channel between said at least one client and said first control channel server function on the basis of said first channel set-up information, said at least one client being configured for receiving at least one manifest file update message from said first control channel server function.

13. A control channel server function associated with at least one delivery node for enabling network-initiated control of streaming of segmented content from said delivery node to one or more clients, said control channel server function being configured for:

receiving at least one request for delivering segmented content to said one or more clients;

generating at least a manifest file comprising one or more segment identifiers and location information for locating one or more content delivery nodes configured to transmit one or more segments associated with said segment identifiers to said one or more clients and channel set-up information;

transmitting said first manifest file to at least one of said one or more clients; and, participating in the set-up of at least a first streaming control channel between said at least one client and said control channel server function, the said set-up being based on said channel set-up information;

and, optionally, said control channel server function being further configured for generating a manifest file update message and/or for transmitting said message via said first streaming control channel to said client.

14. A control channel server function according to claim 13, wherein generating said at least one manifest file comprises:

providing one or more first segment identifiers and first location information for locating one or more content delivery nodes in a first content delivery network (CDN1);

requesting a second content delivery network one or more second segment identifiers and second location information for locating one or more content delivery nodes in said second content delivery network (CDN2);

generating said manifest file on the basis of at least part of said one or more first and second segment identifiers and first and second location information respectively.

15. A computer program product comprising software code portions configured for, when run in the memory of a computer, executing the method steps according to claim 1.

* * * * *